(12) United States Patent
Eto et al.

(10) Patent No.: US 7,460,155 B2
(45) Date of Patent: Dec. 2, 2008

(54) IMAGE SENSING APPARATUS HAVING AN ANTIVIBRATION UNIT, CONTROL METHOD OF THE IMAGE SENSING APPARATUS, AND COMPUTER PROGRAM PRODUCT

(75) Inventors: Kazuhiko Eto, Tokyo (JP); Kaneyoshi Tokano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 622 days.

(21) Appl. No.: 11/192,502

(22) Filed: Jul. 29, 2005

(65) Prior Publication Data

US 2005/0264654 A1 Dec. 1, 2005

Related U.S. Application Data

(62) Division of application No. 09/776,285, filed on Feb. 2, 2001, now Pat. No. 7,113,204.

(30) Foreign Application Priority Data

Feb. 4, 2000 (JP) .............................. 2000-027876
Feb. 10, 2000 (JP) .............................. 2000-033912

(51) Int. Cl.
*H04N 5/228* (2006.01)
(52) U.S. Cl. .................. 348/208.99; 348/352; 348/372
(58) Field of Classification Search ............ 348/208.99, 348/208.1–208.13, 352, 372
See application file for complete search history.

(56) References Cited

U.S. PATENT DOCUMENTS

| 5,175,580 A | 12/1992 | Shiomi |
| 5,337,098 A | 8/1994 | Imafuji et al. |
| 5,420,661 A | 5/1995 | Hamada et al. |
| 5,572,252 A | 11/1996 | Naka et al. |
| 5,589,912 A * | 12/1996 | Shiomi ........................ 396/55 |
| 5,815,742 A | 9/1998 | Hamada et al. |
| 5,867,213 A | 2/1999 | Ouchi |
| 5,937,214 A * | 8/1999 | Shintani et al. ................ 396/55 |

(Continued)

FOREIGN PATENT DOCUMENTS

EP 0 481 230 A2 4/1992

(Continued)

OTHER PUBLICATIONS

Partial European Search Report dated Jun. 29, 2001.

(Continued)

*Primary Examiner*—Lin Ye
*Assistant Examiner*—Gevell Selby
(74) *Attorney, Agent, or Firm*—Morgan & Finnegan, LLP

(57) ABSTRACT

An image sensing apparatus capable of optically correcting blur of an object image by an optical blur correction unit comprises an image sensing unit for converting an optical image of an object into image signals; a display unit for displaying image signals converted by the image sensing unit; a display ON/OFF switch unit for switching between ON/OFF states for displaying the image signals on the display unit when the image sensing apparatus is ON and in an image sensing mode; and a control unit for changing an operational state of the optical blur correction unit depending upon the switching between the ON/OFF states for displaying by the display ON/OFF switch unit.

1 Claim, 14 Drawing Sheets

U.S. PATENT DOCUMENTS

| | | | |
|---|---|---|---|
| 5,940,631 A | 8/1999 | Hirano et al. | |
| 5,982,421 A | 11/1999 | Inou et al. | |
| 6,014,169 A | 1/2000 | Azusawa et al. | |
| 6,046,768 A | 4/2000 | Kaneda et al. | |
| 6,064,826 A | 5/2000 | Washisu | |
| 6,122,446 A * | 9/2000 | Satoh | 396/52 |
| 6,181,875 B1 | 1/2001 | Hamada et al. | |
| 6,573,930 B2 | 6/2003 | Kyuma et al. | |
| 6,614,996 B2 | 9/2003 | Okisu et al. | |
| 6,628,898 B2 | 9/2003 | Endo | |
| 6,900,831 B2 * | 5/2005 | Nishiwaki | 348/208.5 |

FOREIGN PATENT DOCUMENTS

| | | | |
|---|---|---|---|
| JP | 8-087047 A | 4/1996 | |
| JP | 8-313956 A | 11/1996 | |
| JP | 9-033970 | 2/1997 | |
| JP | 9-043664 A | 2/1997 | |
| JP | 9-080532 A | 3/1997 | |
| JP | 9-080575 A | 3/1997 | |
| JP | 10-117301 A | 5/1998 | |
| JP | 10-136254 A | 5/1998 | |
| JP | 10-311993 A | 11/1998 | |
| JP | 10-319457 A | 12/1998 | |
| JP | 11-316398 A | 11/1999 | |
| JP | 2000-023078 A | 1/2000 | |
| JP | 2000-032313 A | 1/2000 | |
| JP | 2000-089283 A | 3/2000 | |

OTHER PUBLICATIONS

European Search Report, Oct. 22, 2001.

Japanese Patent Office; "Japanese Office Action" of corresponding Japanese Patent No. 2001-028276; dated Feb. 10, 2004 (4 pages).

* cited by examiner

IMAGE SENSING APPARATUS HAVING AN ANTIVIBRATION UNIT, CONTROL METHOD OF THE IMAGE SENSING APPARATUS, AND COMPUTER PROGRAM PRODUCT

This application is a divisional of application Ser. No. 09/776,285, filed Feb. 2, 2001, now U.S. Pat. No. 7,113,204, the contents of which are hereby incorporated by reference in their entirety.

FIELD OF THE INVENTION

The present invention relates to an image sensing apparatus such as a digital camera capable of recording an object image by correcting blur of the image, a control method in this kind of image sensing apparatus, and a computer program product for executing the control method by a computer.

BACKGROUND OF THE INVENTION

Conventionally, in the fields of image sensing apparatuses and image sensing control, various image sensing apparatuses having an antivibration unit for correcting blur of an object image have been proposed. When an image is to be recorded by using such an image sensing apparatus, an operator checks an object during image sensing by an object image displayed on a display unit of the image sensing apparatus.

On the other hand, when an image sensing apparatus having an optical finder is used, an operator can check an object by using the optical finder without using any display unit. However, a display unit has no parallax and allows direct observation of an object image to be recorded. Therefore, the general approach is to additionally use a display unit and check an object to be photographed by using this display unit if the object is an important one.

Also, to facilitate recognition and check of an object, an image from which image blur is eliminated by allowing an antivibration unit to function is commonly used as an object image to be displayed. Especially when a high-magnification-zoom image sensing apparatus is used to perform image sensing on a telephoto (long-focal-length) side, a camera shake has a large influence on an object image. Hence, if the antivibration unit does not function, no object can be checked in practice. Accordingly, the antivibration unit is an essential function.

More specifically, a conventional camera shake preventing device detects a vibration of a camera such as a camera shake by using a vibration detector, e.g., an angular velocity sensor using Coriolis force or a vibration gyro as a velocity sensor. On the basis of this vibration detection, the device calculates an appropriate correction value for blur correction. On the basis of this correction value, the device moves a blur correction lens (antivibration lens) in a direction perpendicular to the optical axis to correct the optical path, thereby preventing image blur caused by a camera shake. As an actuator for driving this antivibration lens, a voice coil motor is generally used.

As image sensing apparatuses such as digital cameras and video cameras, those incorporating an image display device are widely used. This image display device is used as an electronic finder during photography and used to display photographed images. Liquid crystal displays are used in many such display devices. A liquid crystal display is illuminated by a backlight using a light source such as a cold-cathode tube.

Also, the above-mentioned cameras and electronic image sensing apparatuses use a rechargeable battery, e.g., a lithium ion battery or a nickel-cadmium battery, as a power supply.

Unfortunately, considerable power is consumed to drive the antivibration lens. Since this accelerates the exhaustion of the battery, no long-time photography can be performed.

As a method of reducing the consumption of power, it is possible to stop the antivibration unit when the residual amount of the power supply battery reduces and thereby ensure a certain number of images to be photographed. However, no desired images can be recorded if the vibration preventing function is thus abandoned and images containing blur components exceeding an allowable range are recorded.

SUMMARY OF THE INVENTION

The present invention is to provide an image sensing apparatus capable of effective optical blur correction with low power consumption or without sacrificing an vibration preventing function even when the residual amount of a battery is small, a control method of the image sensing apparatus, and a computer program product to the image sensing apparatus.

To achieve the above object, an image sensing apparatus, a-control method of the image sensing apparatus, and a computer program product to the image sensing apparatus according to the present invention are characterized by comprising at least the following arrangements.

According to the present invention, the foregoing object is attained by providing an image sensing apparatus capable of optically correcting blur of an object image by an optical blur correction unit, comprising: an image sensing unit for converting an optical image of an object into image signals; a display unit for displaying image signals converted by the image sensing unit; a display ON/OFF switch unit for switching between ON/OFF states for displaying the image signals on the display unit when the image sensing apparatus is ON and in an image sensing mode; and a control unit for changing an operational state of the optical blur correction unit depending upon the switching between the ON/OFF states for displaying by the display ON/OFF switch unit.

According to another aspect of the present invention, the foregoing object is attained by providing an image sensing apparatus capable of optically correcting blur of an object image by an optical blur correction unit, comprising: an image sensing unit for converting an optical image of an object into image signals; a display unit for displaying image signals converted by the image sensing unit; and a control unit for controlling an operation of the optical blur correction unit in accordance with a display state of the image signals on the display unit when the image sensing apparatus is ON and in an image sensing mode.

In still another aspect of the present invention, the foregoing object is attained by providing an image sensing apparatus capable of optically correcting blur of an object image by an optical blur correction unit, comprising: an image sensing unit for converting an optical image of an object into image signals; a display unit for displaying image signals converted by the image sensing unit; a display ON/OFF switch unit for switching between ON/OFF states for displaying the image signals on the display unit; an operation unit for designating start of photographing; and a control unit for activating the optical blur correction unit, after the operation unit is activated, in response to the switching to the OFF state by the display ON/OFF switch unit.

In still another aspect of the present invention, the foregoing object is attained by providing an image sensing apparatus capable of optically correcting blur of an object image by an optical blur correction unit, comprising: an image sensing unit for converting an optical image of an object into image signals; a display unit for displaying image signals converted by the image sensing unit; an operation unit for designating start of photographing; and a control unit for activating the optical blur correction unit after the operation unit is activated in a case where the image signals are not displayed on the display unit.

In still another aspect of the present invention, the foregoing object is attained by providing a control method for controlling an image sensing apparatus capable of optically correcting blur of an object image by an optical blur correction unit, the control method comprising: an operational state of the optical blur correction unit is changed depending upon switching between ON/OFF states for displaying image signals from an image sensing unit which is for converting an optical image of an object into image signals, when the image sensing apparatus is ON and in an image sensing mode.

In still another aspect of the present invention, the foregoing object is attained by providing a control method for controlling an image sensing apparatus capable of optically correcting blur of an object image by an optical blur correction unit, the control method comprising: an operational state of the optical blur correction unit is controlled depending upon a display state of displaying image signals from an image sensing unit which is for converting an optical image of an object into image signals, when the image sensing apparatus is ON and in an image sensing mode.

In still another aspect of the present invention, the foregoing object is attained by providing a control method for controlling an image sensing apparatus capable of optically correcting blur of an object image by an optical blur correction unit, the control method comprising: the optical blur correction unit is activated in response to switching to an OFF state for displaying image signals from an image sensing unit which is for converting an optical image of an object into image signals after an operation unit for designating start of photographing is activated.

In still another aspect of the present invention, the foregoing object is attained by providing a control method for controlling an image sensing apparatus capable of optically correcting blur of an object image by an optical blur correction unit, the control method comprising: the optical blur correction unit is activated after an operation unit for designating start of photographing is activated in a case where image signals from an image sensing unit which is for converting an optical image of an object into image signals are not displayed.

In still another aspect of the present invention, the foregoing object is attained by providing a computer program product comprising a computer usable medium having computer readable program code means embodied in the medium for an image sensing apparatus capable of optically correcting blur of an object image by an optical blur correction unit, the product including: a module for changing an operational state of the optical blur correction unit depending upon switching between ON/OFF states for displaying image signals from an image sensing unit which is for converting an optical image of an object into image signals, when the image sensing apparatus is ON and in an image sensing mode.

In still another aspect of the present invention, the foregoing object is attained by providing a computer program product comprising a computer usable medium having computer readable program code means embodied in the medium for an image sensing apparatus capable of optically correcting blur of an object image by an optical blur correction unit, the product including: a module for controlling an operational state of the optical blur correction unit depending upon a display state of displaying image signals from an image sensing unit which is for converting an optical image of an object into image signals when the image sensing apparatus is ON and in an image sensing mode.

In still another aspect of the present invention, the foregoing object is attained by providing a computer program product comprising a computer usable medium having computer readable program code means embodied in the medium for an image sensing apparatus capable of optically correcting blur of an object image by an optical blur correction unit, the product including: a module for activating the optical blur correction unit in response to the switching to an OFF state for displaying image signals from an image sensing unit which is for converting an optical image of an object into image signals after an operation unit for designating start of photographing is activated.

In still another aspect of the present invention, the foregoing object is attained by providing a computer program product comprising a computer usable medium having computer readable program code means embodied in the medium for an image sensing apparatus capable of optically correcting blur of an object image by an optical blur correction unit, the product including: a module for activating the optical blur correction unit after an operation unit for designating start of photographing is activated in a case where image signals from an image sensing unit which is for converting an optical image of an object into image signals are not displayed.

In still another aspect of the present invention, the foregoing object is attained by providing an image sensing apparatus to which a blur correction unit for correcting blur in an object image is applied, comprising: an operation unit for designating start of photographing; a determination unit for determining a battery level of a power supply battery for supplying power to the blur correction unit; and a control unit for allowing the blur correction unit to operate after the operation unit is activated in a case where a determination result by the determination unit indicates that the battery level is less than a predetermined level.

In still another aspect of the present invention, the foregoing object is attained by providing a control method for controlling an image sensing apparatus to which a blur correction unit for correcting blur in an object image is applied, the control method comprising: a battery level of a power supply battery for supplying power to the blur correction unit is determined, and the blur correction unit is allowed to operate after an operation unit for designating start of photographing is activated in a case where the battery level is less than a predetermined level.

In still another aspect of the present invention, the foregoing object is attained by providing a computer program product comprising a computer usable medium having computer readable program code means embodied in the medium for an image sensing apparatus to which a blur correction unit for correcting blur in an object image is applied, the product including: a module for detecting a battery level of a power supply battery for supplying power to the blur correction unit, and allowing the blur correction unit to operate after an operation unit for designating start of photographing is activated in a case where the battery level is less than a predetermined level.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
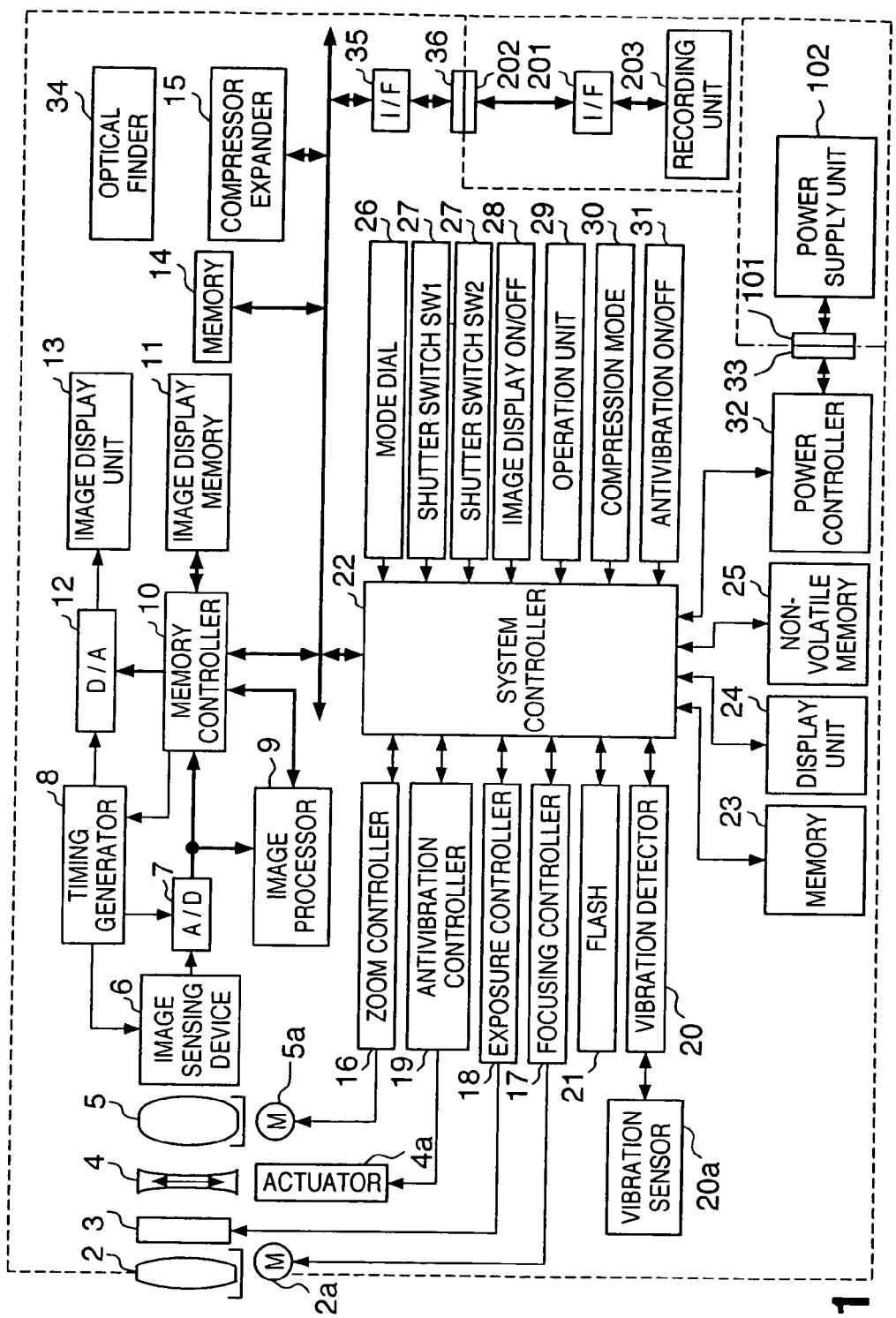
FIG. 1 is a block diagram showing the arrangement of a digital camera according to the present invention.

FIG. 1 is a block diagram of a digital camera according to the present invention. In FIG. 1, reference numeral 1 denotes a digital camera; 2, a focusing lens; 3, a shutter having a stopping function; 4, a blur correction lens; 5, a zoom lens; 6, an image sensing device for converting an optical image into an electrical signal; and 7, an A/D converter for converting an output analog signal from the image sensing device 6 into a digital signal. The focusing lens 2 and the zoom lens 5 are moved in an optical-axis direction by motors 2a and 5a, respectively. The blur correction lens 4 is moved in a direction perpendicular to the optical axis by an actuator 4a. This actuator 4a is a voice coil motor or the like.

A timing generator 8 supplies a clock signal and a control signal to the image sensing device 6, the A/D converter 7, and a D/A converter 12, under the control of a memory controller 10 and a system controller 22.

An image processor 9 performs predetermined pixel interpolation and color conversion for data from the A/D converter 7 or from the memory controller 10. The image processor 9 also performs a predetermined arithmetic operation by using sensed image data. On the basis of the operation result obtained by the image processor 9, the system controller 22 performs TTL (Through The Lens) AF (Auto-Focusing), AE (Automatic Exposure), and EF (pre-Emission of Flash) for controlling an exposure controller 18 and a focusing controller 17.

Furthermore, the image processor 9 performs TTL AWB (Auto White Balancing) by which a predetermined arithmetic operation is performed by using sensed image data, and AWB is performed on the basis of the operation result.

Under the control of the system controller 22, the memory controller 10 controls data input/output with respect to the A/D converter 7, the timing generator 8, the image processor 9, the image display memory 11, the D/A converter 12, a memory 14, and a compressor expander 15. Under the control of the memory controller 10, output data from the A/D converter 7 is written in the image display memory 11 or the memory 14 via the image processor 9 or directly.

An image display unit 13 comprises a TFT LCD (Thin-Film Transistor Liquid Crystal Display) or the like. This image display unit 13 displays, e.g., image data to be displayed which is written in the image display memory 11, via the D/A converter 12 under the control of the memory controller 10. By successively displaying sensed image data on this image display unit 13, an electronic finder function is implemented. The image display unit 13 can also turn on and off its display, under the control of the system controller 22, in accordance with ON/OFF of an image ON/OFF switch 28 to be described later. When no image display is necessary, the power consumption of the digital camera 1 can be greatly reduced by turning off the display.

The memory 14 stores sensed still images and motion images. The storage capacity of this memory 14 is large enough to store a predetermined number of still images or a predetermined time of motion images. Even when continuous photographing or panorama photographing by which a plurality number of still images are continuously photographed is performed, a large amount of images can be written at high speed. This memory 14 can also be used as a working area of the system controller 22.

The compressor expander 15 compresses and expands image data by, e.g., adaptive discrete cosine transform (ADCT). That is, this compressor-expander 15 reads out an image stored in the memory 14, compresses or expands the readout image, and again writes the compressed or expanded data into the memory 14.

A zoom controller 16 controls a zooming operation by the zoom lens 5. The focusing controller 17 controls a focusing operation by the focusing lens 2.

The exposure controller 18 controls the shutter 3 having a stopping function. This exposure controller 18 also has a flash light control function interlocked with an electronic flash 21.

An antivibration controller 19 moves the blur correction lens in the direction perpendicular to the optical axis by controlling driving of the actuator 4a in accordance with an instruction from the system controller 22, thereby correcting image blur caused by a camera shake or the like. A vibration detector 20 detects a vibration of the digital camera 1 resulting from a camera shake or the like on the basis of a signal from a vibration sensor 20a which is, e.g., an angular velocity sensor using Coriolis force or a vibration gyro. A vibration detection signal from this vibration detector 20 is input to the system controller 22. On the basis of, e.g., the input vibration detection signal and the focal length of the lens, the system controller 22 calculates the amount and direction of blur of an image on the image forming surface of the image sensing device 6, and calculates an appropriate blur correction amount (vector) on the basis of the calculated values. On the basis of this calculated blur correction amount, the system controller 22 controls driving of the actuator 4a for blur correction via the antivibration controller 19, thereby moving the blur correction lens 4 to correct the blur.

Generally, the term "vibration" is included in the term "blur" and regarded as a subordinate concept of "blur". However, in this specification these two terms are used as synonyms.

The electronic flash 21 has a function of emitting AF auxiliary light, in addition to the flash light control function. A memory 23 stores, e.g., various constants, variables, and programs for the operation of the system controller 22. A display unit 24 displays operating states, messages, and the like by using, e.g., characters, images, and sound in accordance with the execution of programs by the system controller 22.

This display unit 24 is formed by the combination of an LCD, LEDs, lamps, and sound generating elements. One or a plurality of these components are arranged in visually readily recognizable positions near operating mechanisms to be described later of the digital camera 1. Some display functions of the display unit 24 are installed in an optical finder 34.

Of the contents displayed on the display unit 24, those displayed on the LCD or the like are, e.g., a single shot/continuous photographing display, a self timer display, the compression ratio, the number of recording pixels, the number of recording frames, the number of remaining photographable frames, the shutter speed, the F-number, an exposure correction display, an electronic flash display, a red eye reduction display, a macro photographing display, a buzzer setting display, the residual amount of a clock battery, the residual amount of a battery, an error display, an information display by a plurality of digits, a communication I/F operation display, a date-time display, and the state of connection to an external computer.

Of the contents displayed on the display unit 24, those indicated by LEDs or the like are, e.g., an in-focus indication, photographing preparation completion indication, camera shake warning indication, electronic flash charge indication, electronic flash charge completion indication, and macro photographing setting notification indication. An example of lamps or the like used to display contents on the display unit 24 is a self timer indicator lamp. This self timer indicator lamp can also be used as AF auxiliary light.

Of the contents displayed on the display unit 24, those indicated in the optical finder 34 are, e.g., an in-focus indication, a photographing preparation completion indication, a camera shake warning indication, an electronic flash charge indication, an electronic flash charge completion indication, the shutter speed, the F-number, and an exposure correction display.

An electrically erasable and recordable nonvolatile memory 25 is, e.g., an EEPROM. This nonvolatile memory 25 stores data for AE (Automatic Exposure), lens focus data for AF (Auto-Focusing), and data for various control operations by the system controller 22. Operating mechanisms for instructing the system controller 22 to perform various operations include a mode dial switch 26, a shutter switch 27, the image display ON/OFF switch 28, an operation unit 29, a compression mode switch 30, and an antivibration ON/OFF switch 31. These operating mechanisms are constructed by one or the combination of, e.g., a switch, touch panel, pointing mechanism using eye sensing, and voice recognition device.

The mode dial switch 26 switches ON/OFF of the power supply and also switches diverse function modes, e.g., an automatic photographing mode, photographing mode, panorama photographing mode, playback mode, multi-frame playback-erase mode, and PC connection mode. The shutter switch 27 is attached to a release button (not shown). This shutter switch 27 has a switch SW1 which is turned on when the release button is pressed halfway, and a switch SW2 which is turned on when the release button is fully pressed.

When the switch SW1 is turned on, the operations of, e.g., AF (Auto-Focusing), AE (Automatic Exposure), AWB (Auto White Balancing), or EF (pre-Emission of Flash) are started. That is, this switch SW1 functions as a trigger unit for photographing preparations. When the switch SW2 is turned on, the operations of a series of photographing processes are started. These processes include: an exposure process by which a signal read out from the image sensing device 6 is written as image data into the memory 14 via the A/D converter 7 and the memory controller 10; a development process which uses arithmetic operations in the image processor 9 and the memory controller 10; and a recording process by which the image data is read out from the memory 14, compressed by the compressor·expander 15, and written in a recording unit 203. That is, this switch SW2 functions as a trigger unit of start of photography.

The image display ON/OFF switch 28 sets display ON/OFF of the image display unit 13. When photography is performed using the optical finder 34, this display ON/OFF function shuts down power supply to the image display unit 13 comprising a TFT LCD and the like, thereby achieving energy saving.

The operation unit 29 includes various buttons and touch panels. Examples of the buttons of this operation unit 29 are a menu button, set button, macro button, multi-frame playback page-turning button, flash setting button, single shot/continuous photographing/self timer switching button, menu plus moving button, menu minus moving button, playback image plus moving button, playback image minus moving button, photographing image quality select button, exposure correction button, and date/time setting button.

The compression mode switch 30 is a switch for selecting the compression ratio of JPEG compression. For example, a normal mode and fine mode are prepared as JPEG compression modes. In each JPEG compression mode, image data stored in the memory 14 is read out, compressed in accordance with a compression ratio corresponding to the selected mode by the compressor·expander 15, and recorded in the recording unit 203.

The antivibration ON/OFF switch 31 is used to set whether to perform an antivibration operation, e.g., whether to correct image blur caused by a vibration such as a camera shake. Energy saving can be achieved by executing this antivibration operation as needed.

A power controller 32 comprises a battery detector, a DC-DC converter, and a switching unit for switching blocks to be powered. This power controller 32 detects the presence/absence of a battery, the type of battery, and the residual battery capacity. On the basis of these detection results and an instruction from the system controller 22, the power controller 32 controls the DC-DC converter to supply necessary voltages to individual units including a recording medium for necessary time periods. Reference numerals 33 and 101 denote connectors; and 102, a power supply unit including, e.g., a rechargeable battery such as a lithium ion battery, nickel-hydrogen battery, or nickel-cadmium battery, and an AC adapter.

The optical finder 34 directly displays an image from an optical system including, e.g., the focusing lens 2, the blur correction lens 4, and the zoom lens 5, without passing the image through the image sensing device 6 (electronic system). Image sensing can be performed using only this optical finder without using the electronic finder function of the image display unit 13.

In the optical finder 34, some display functions of the display unit 24 are installed. Reference numerals 35 and 201 denote interfaces with recording media such as a memory card and hard disk; and 36 and 202, connectors for connecting with the recording unit 203. The recording unit 203 comprises a semiconductor memory or a magnetic disk and records images, sound, and additional data.

The image sensing operations of the digital camera 1 will be described below with reference to flow charts in FIGS. 2 to 10.

Image Sensing Operation by First Embodiment

The image sensing operation by the first embodiment will be described below with reference to the flow charts in FIGS. 2 to 4. The system controller 22 performs the following processing in accordance with the programs stored in the memory 23. In this first embodiment, the antivibration ON/OFF switch 31 is not necessarily used.

When the power supply is turned on, the system controller 22 first initializes flags, control variables, and the like, moves the blur correction lens 4 to the initial position (step S101), and turns off an image display on the image display unit 13 (step S102). The system controller 22 then checks whether the power supply unit 102 is normal (step S103). This determination is done by checking, by using the power controller 32, whether the power supply unit 102, e.g., the residual capacity of the battery of the power supply unit 102 permits the digital camera 1 to normally operate. If the power supply unit 102 is not normal, the system controller 22 performs a predetermined warning display operation by images or sound by using the display unit 24 (step S104), and the flow returns to step S103.

If the power supply unit 102 is normal, the system controller 22 checks whether the recording unit 203 is normal (step S105). This determination is done by checking whether the recording unit 203 is in a condition by which image data can be recorded and reproduced. If the recording unit 203 is not normal, the system controller 22 performs a predetermined warning display operation by images or sound by using the display unit 24 (step S104), and the flow returns to step S103. If the recording unit 203 is normal, the system controller 22 displays various set conditions of the digital camera 1 by images or sound by using the display unit 24 (step S106).

Subsequently, the system controller 22 checks the set condition of the image display ON/OFF switch 28 (step S107). If the image display ON/OFF switch 28 is set in an image display ON state, the system controller 22 turns on an image display on the image display unit 13 and displays various set conditions of the digital camera 1 by images or sound on the image display unit 13 (step S108). Furthermore, the system controller 22 sets a through display state in which sensed image data is successively displayed (step S110), and the flow advances to step Sill.

In this through display state, image data successively written in the image display memory 11 via the image sensing device 6, the A/D converter 7, the image processor 9, and the memory controller 10 is successively displayed on the image display unit 13 via the memory controller 10 and the D/A converter 12, thereby implementing the electronic finder function.

On the other hand, if the image display ON/OFF switch 28 is set in an image display OFF state, the system controller 22 turns off an image display on the image display unit 13 (step S109), and the flow advances to step S301. In this image display OFF state, photography can be performed while an image to be photographed is checked through the optical finder 34, without using the electronic finder function of the image display unit 13. In this case, power consumed by, e.g., the image display unit 13 or the D/A converter 12 which consumes large power can be cut.

If the through display state has no problem, the system controller 22 starts a blur detection process by which blur is detected by the blur detector 20 (step S111). Since the blur detector 20 inputs a blur detection signal to the system controller 22, the system controller 22 starts an optical blur correction process based on this blur detection signal (step S112). This blur correction process is done by controlling driving of the actuator 4a by the antivibration controller 19, thereby moving the blur correction lens 4 in the direction perpendicular to the optical axis.

The system controller 22 checks whether the switch SW1 of the shutter switch 27 is ON (step S201). If the switch SW1 is OFF, the flow returns to step S103. If the switch SW1 is ON, the system controller 22 causes the focusing controller 17 to execute a focusing process to focus the focusing lens 2 on an object, and performs photometry to determine an F-number and a shutter speed (step S202). In this photometry, electronic flash setting is also performed if necessary. Details of this focusing-photometry process will be described later with reference to FIG. 9.

The system controller 22 then checks whether the switch SW2 of the shutter switch 27 is ON (step S203). If this switch SW2 is ON, the flow advances to step S205. In step S205, the system controller 22 executes an image sensing process including an exposure process and a development process. In the exposure process, sensed image data is written in the memory 14 via the image sensing device 6, the A/D converter 7, the image processor 9, and the memory controller 10, or from the A/D converter 27 via the memory controller 10 without being passed through the image processor 9. In the development process, the system controller 22 uses the memory controller 10 (and the image processor 9 where necessary) to read out the image data written in the memory 14 and perform various processes. Details of this image sensing process will be described later with reference to FIG. 10.

When the image sensing process is complete, the system controller 22 reads out the sensed image data written in the memory 14 and performs various processes by using the memory controller 10 (and the image processor 9 if necessary), and also performs a compression process, by using the compressor·expander 15, in which image compression corresponding to the set mode is performed (step S206). The system controller 22 then executes a recording process by which the image data is written in the recording unit 203, such as a memory card or a compact flash card, via the interface 35 or 201 and the connector 36 or 202 (step S207), and completes the processing.

While the image data is written in the recording unit 203, the system controller 22 displays, e.g., "BUSY" on the image display unit 13 and turns on and off an LED on the display unit 24, in order to clearly indicate that the writing operation is being performed.

If the switch SW2 is OFF in step S203, the system controller 22 checks whether the switch SW1 is ON (step S204). If the switch SW1 is ON, i.e., if the switch SW2 is not turned on while the switch SW1 is kept on, the flow returns to step S203. On the other hand, if the switch SW1 is OFF, i.e., if the switch SW1 is turned on once but turned off after that while the switch SW2 is kept OFF, the flow returns to step S103.

If the image display ON/OFF switch 28 is set in the image display OFF state in step S107, the system controller 22 turns off an image display on the image display unit 13 in step S109 as described above. After that, the flow advances to step S301, and the system controller 22 checks whether the switch SW1 is ON. If the switch SW1 is OFF, the flow returns to step S103.

If the switch SW1 is ON, the system controller 22 allows the blur detector 20 to start a blur detection process for detecting blur (step S302). Since the blur detector 20 inputs a blur detection signal to the system controller 22, the system controller 22 starts an optical blur correction process based on this blur detection signal (step S303). This blur correction process is done by controlling driving of the actuator 4a by the antivibration controller 19, thereby moving the blur correction lens 4 in the direction perpendicular to the optical axis.

Figure 3:
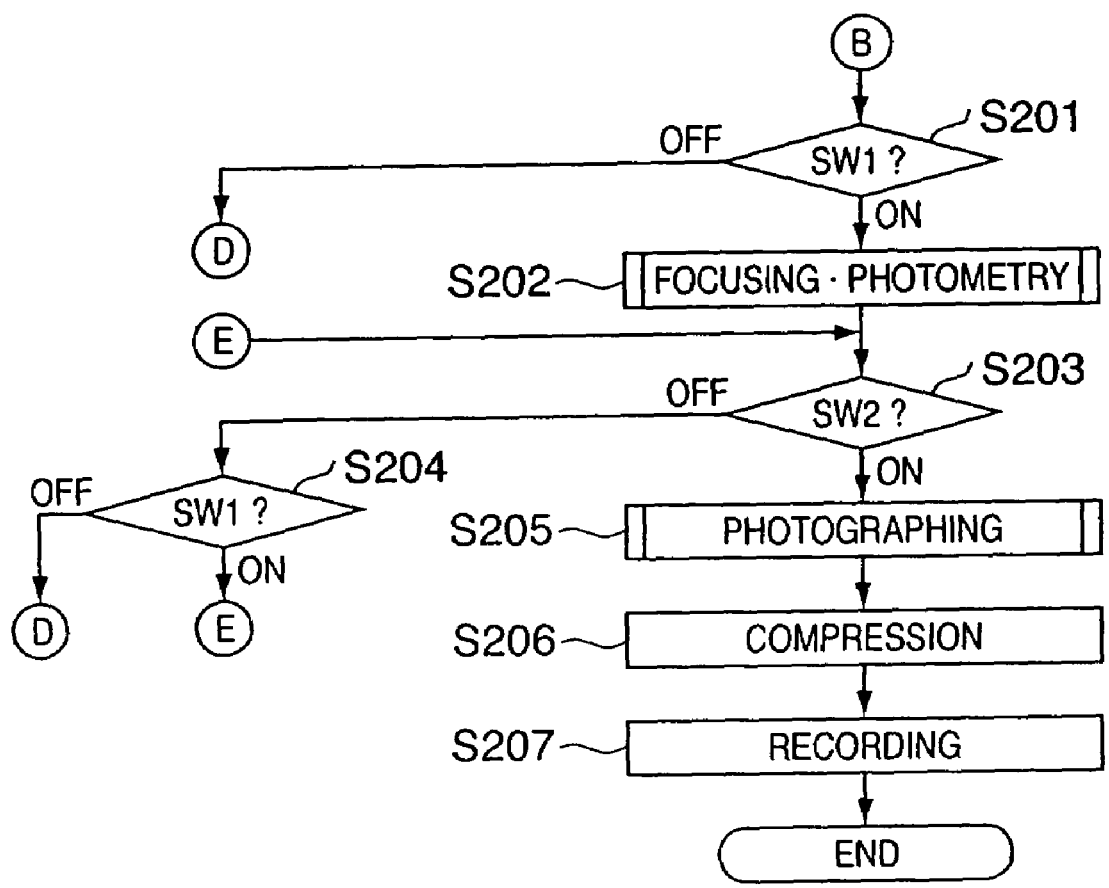
FIG. 3 is a flow chart for explaining processing continued from B in the flow chart of FIG. 2.
Figure 4:
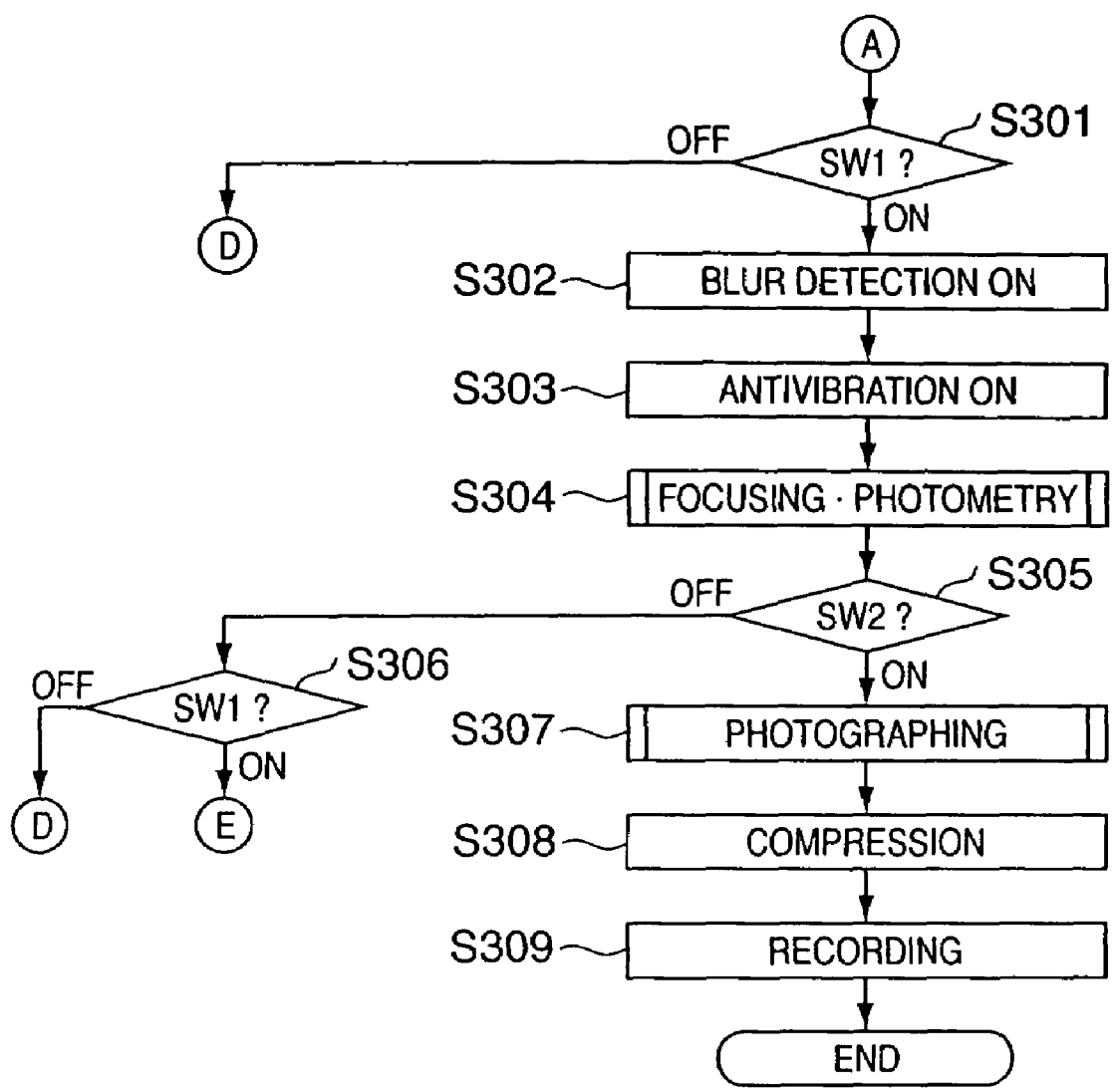
FIG. 4 is a flow chart for explaining processing continued from A in the flow chart of FIG. 2.
Figure 5:
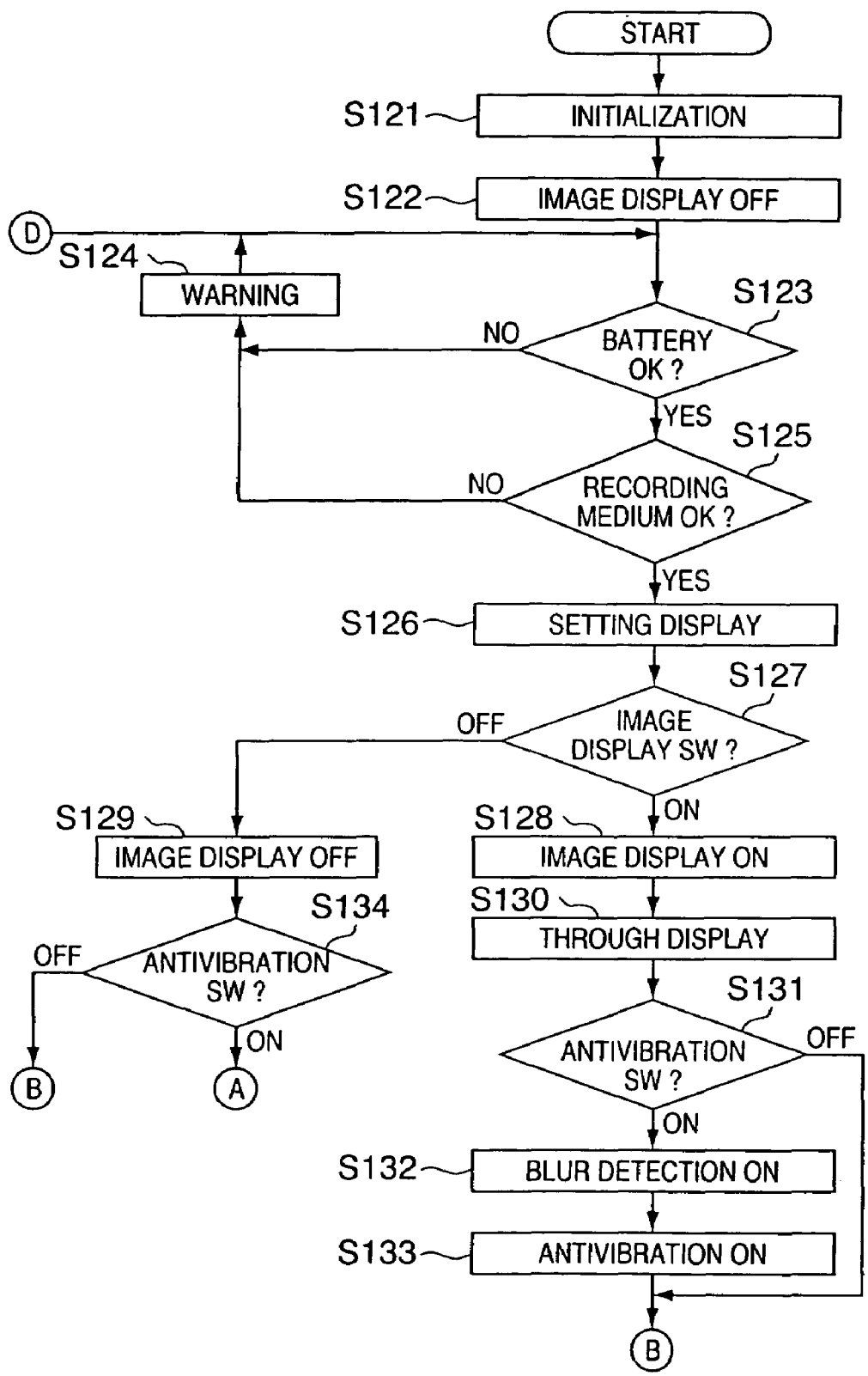
FIG. 5 is a flow chart for explaining an image sensing operation according to the second embodiment of the present invention.
Figure 6:
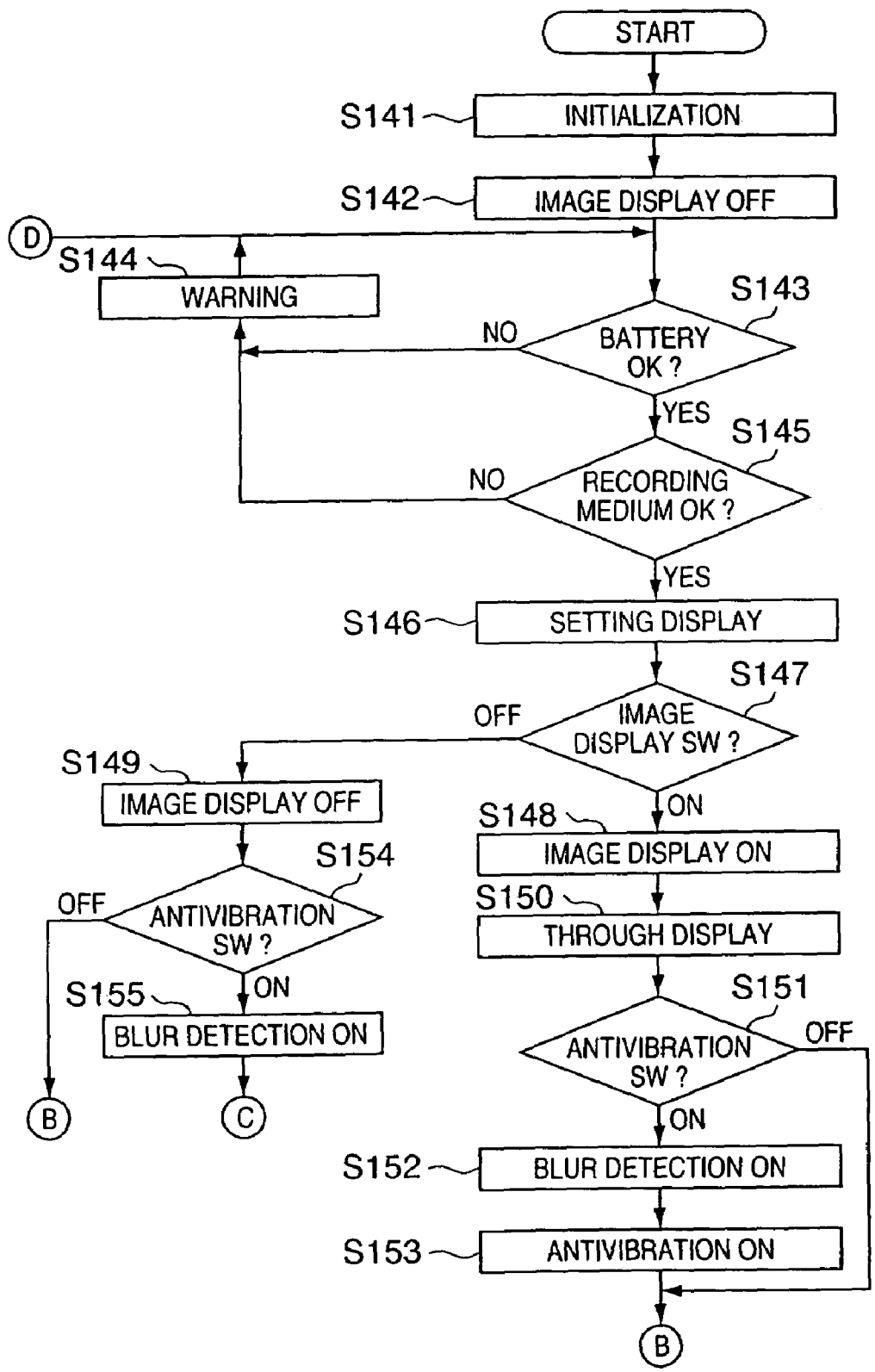
FIG. 6 is a flow chart for explaining an image sensing operation according to the third embodiment of the present invention.

Subsequent processes from a focusing-photometry process (step S304) to a recording process (step S309) are exactly the same as steps 202 to S207 in FIG. 3, so a detailed description thereof will be omitted.

In the first embodiment as described above, when an image display on the image display unit 13 is ON, the system controller 22 starts blur detection and blur correction. When an image display on the image display unit 13 is OFF, the system controller 22 starts blur detection and blur correction after the switch SW1 of the shutter switch 27 is turned on.

In other words, in the first embodiment, when an image is displayed on the image display unit 13, the user can previously check an image to be photographed, i.e., a blur correction result, on the image display unit 13. Hence, the system controller 22 starts blur detection and blur correction immediately after confirming the display ON state. When no image is displayed on the image display unit 13, the user cannot previously check a blur correction result on the image display unit 13. Therefore, the system controller 22 starts blur detection and blur correction after the switch SW1 of the shutter switch 27 is turned on, thereby shortening the processing time of blur detection and blur correction and saving the power consumption as much as possible.

Accordingly, even the digital camera 1 using a battery as a power supply can continue photographing for long time periods, and this improves the ease of use.

Figure 9:
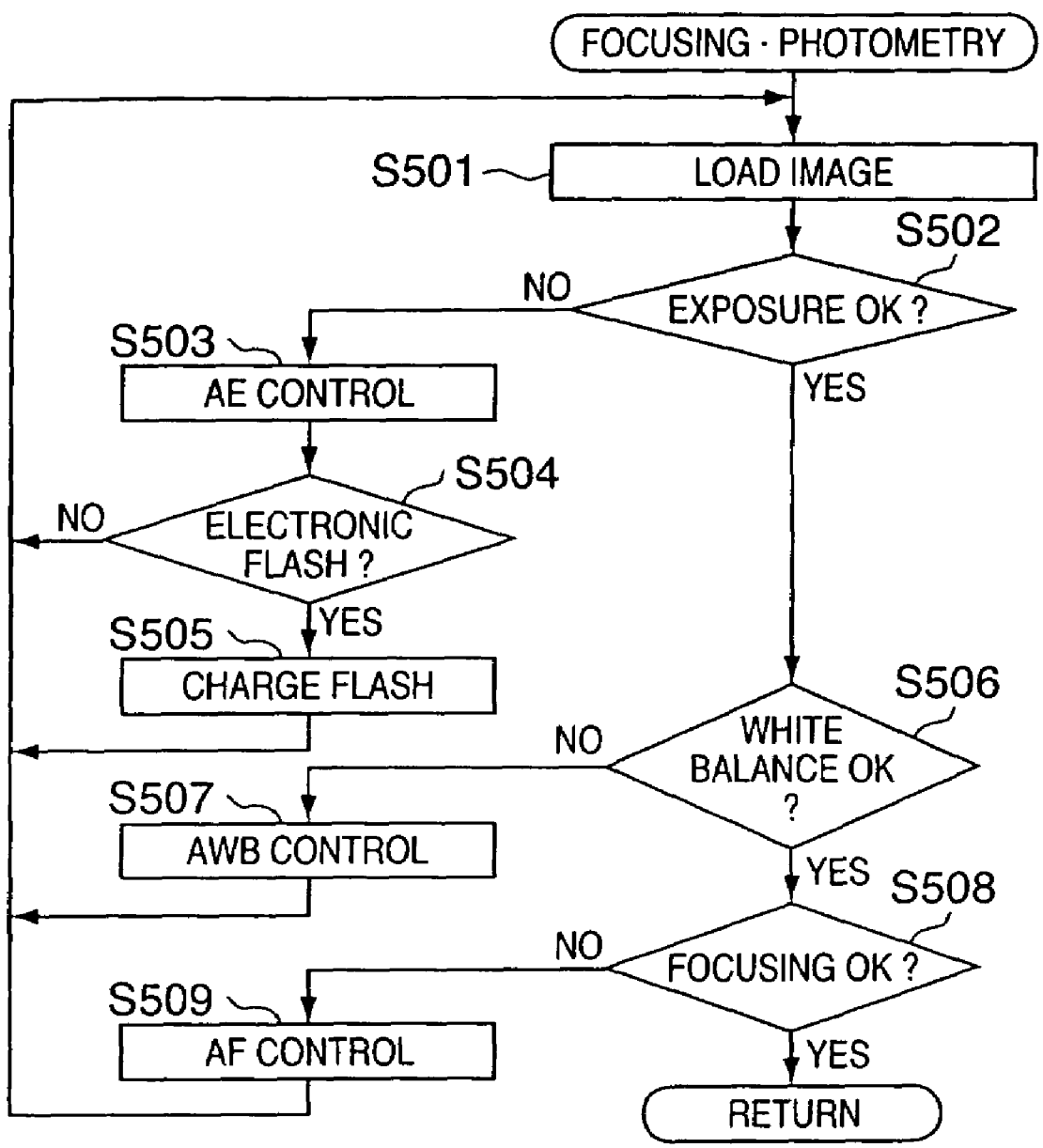
FIG. 9 is a flow chart of a focusing-photometry routine.

The focusing-photometry process performed under the control of the system controller 22 in step S202 of FIG. 3 (and in steps S304 and S403 of FIGS. 4 and 8, respectively) will be described in detail below with reference to the flow chart in FIG. 9.

The system controller 22 reads out an electric charge signal from the image sensing device 6 and successively loads photographed image data into the image processor 9 via the A/D converter 7 (step S501). By using this successively loaded image data, the image processor 9 performs predetermined arithmetic operations necessary for TTL (Through The Lens) AE (Automatic Exposure), EF (pre-Emission of Flash), and AF (Auto-Focusing). In each processing, a necessary number of specific portions are extracted from all photographed pixels and used in an arithmetic operation. This makes it possible to perform an optimum arithmetic operation for each of different modes such as a center weighted mode, average mode, and evaluation mode in each of TTL AE, EF, AWB, and AF.

By using the arithmetic operation results from the image processor 9, the system controller 22 performs AE control by using the exposure controller 18 (step S503) until exposure (AE) is found to be correct (step S502). Also, by using measurement data obtained by this AE control, the system controller 22 checks whether the electronic flash is necessary (step S504). If the electronic flash is necessary, the system controller 22 sets an electronic flash flag and charges the electronic flash 21 (step S505).

If the exposure (AE) is found to be correct (step S502), the system controller 22 stores the measurement data or set parameters in an internal memory of the system controller 22 or in the memory 14. By using the arithmetic operation results from the image processor 9 and the measurement data obtained by the AE control, the system controller 22 performs AWB control by adjusting color processing parameters by using the image processor 9 (step S507) until white balance (AWB) is found to be optimal (step S506).

If the white balance (AWB) is found to be optimal (step S506), the system controller 22 stores the measurement data or set parameters in the internal memory of the system controller 22 or in the memory 14. By using the measurement data obtained by the AE control and the AWB control, the system controller 22 performs AF control by using the focusing controller 17 (step S509) until the focusing lens 2 becomes in-focus (step S508). If the focusing lens 2 becomes in-focus (step S508), the system controller 22 stores the measurement data or set parameters in the internal memory of the system controller 22 or in the memory 14, and completes the focusing photometry process routine.

Figure 10:
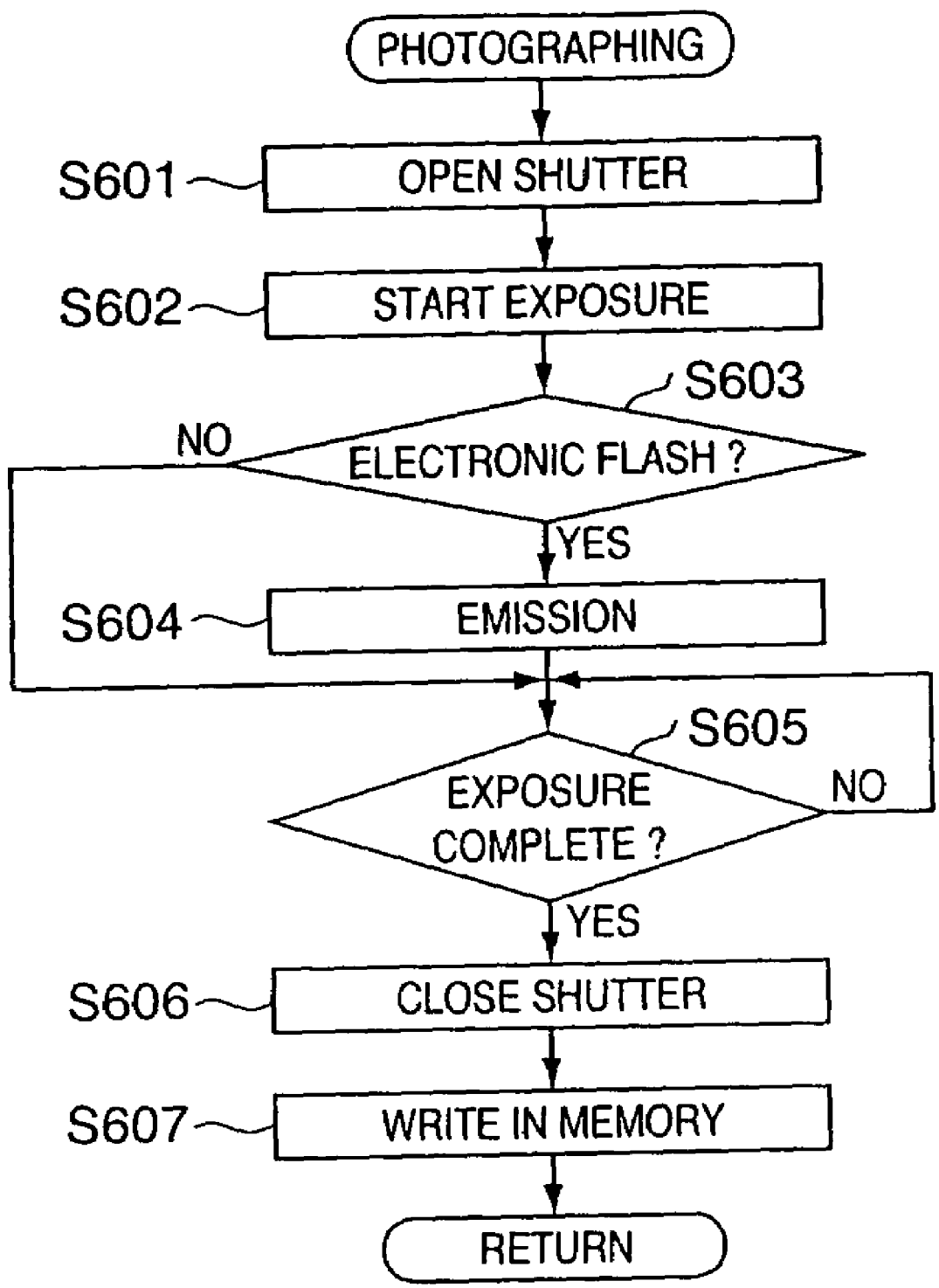
FIG. 10 is a flow chart of an image sensing routine.

The image sensing process performed under the control of the system controller 22 in step S205 of FIG. 3 (and in steps S307 and S406 of FIGS. 4 and 8, respectively) will be described in detail below with reference to the flow chart in FIG. 10.

In accordance with the photometric data stored in the internal memory of the system controller 22 or in the memory 14, the system controller 22 causes the exposure controller 18 to open the shutter 3 having a stopping function in accordance with the F-number, thereby exposing the image sensing device 6 (steps S601 and S602).

The system controller 22 then checks by the electronic flash flag whether the electronic flash 21 is necessary (step S603). If the electronic flash 21 is necessary, the system controller 22 causes the electronic flash to emit light (step S604), and the flow advances to step S605. If the electronic flash 21 is unnecessary, the flow advances to step S604 by skipping step S604.

In step S605, the system controller 22 waits until an exposure process corresponding to the photometric data is completely performed for the image sensing device 6. If the exposure process is complete, the system controller 22 closes the shutter 3 (step S606). Subsequently, the system controller 22 reads out the electric charge signal from the image sensing device 6, writes the photographed image data into the memory 14 via the A/D converter 7, the image processor 9, and memory controller 10, or from the A/D converter 7 via the memory controller 10 without passing the data through the image processor 9 (step S607), and completes the image sensing process routine.

Image Sensing Operation by Second Embodiment

Image sensing operations in other embodiments will be described below with reference to flow charts. A description of steps in which the same processes as in the first embodiment are performed will be omitted as much as possible, and differences will be primarily explained.

In the second embodiment, the power consumption is reduced by using an antivibration ON/OFF switch 31 for turning on and off antivibration. An image sensing operation in this second embodiment will be described below with reference to the flow chart in FIG. 5.

Figure 2:
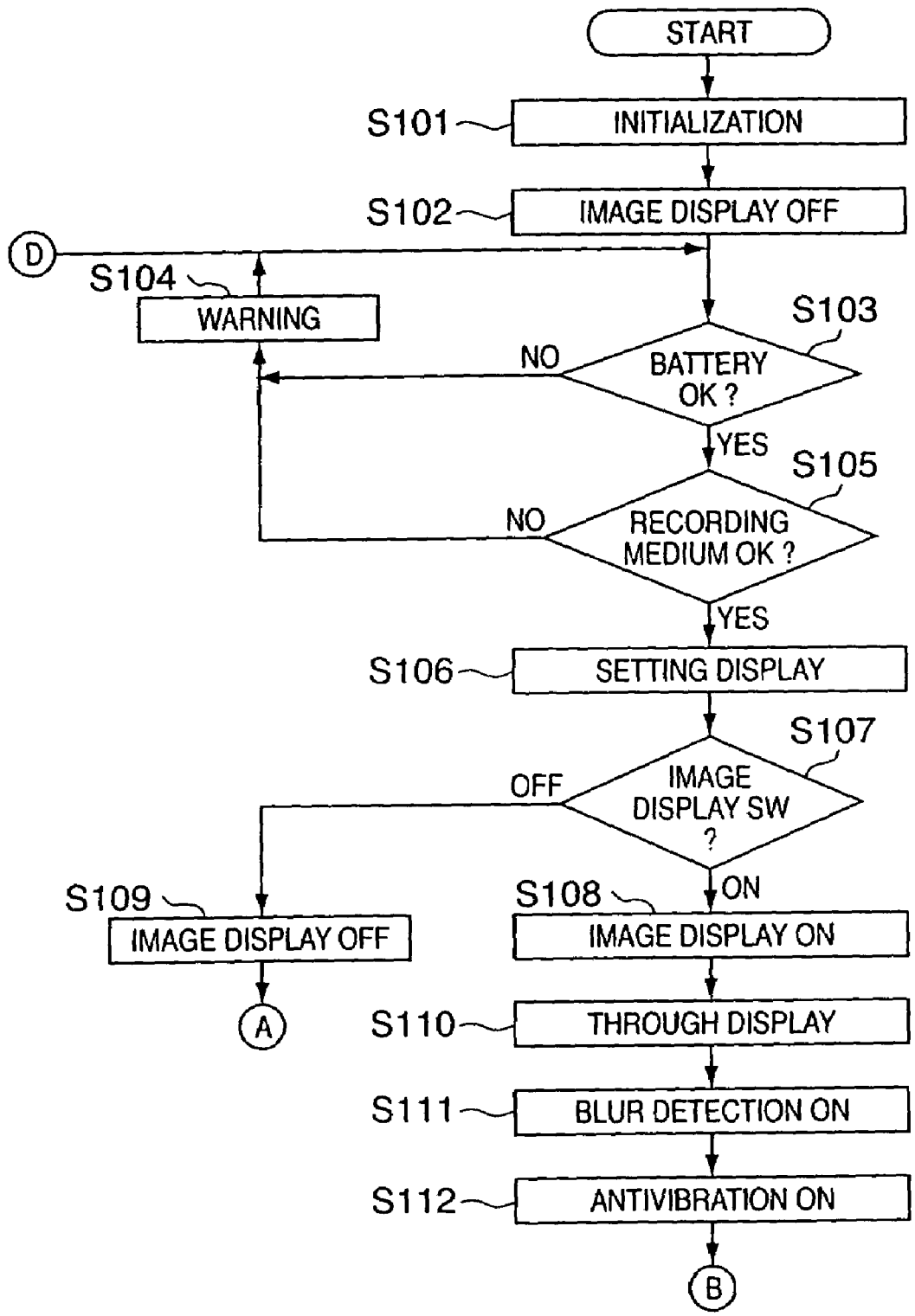
FIG. 2 is a flow chart showing an image sensing operation according to the first embodiment of the present invention.

Processes from initialization (step S121) to setting display (step S126) are analogous to the processes in steps S101 to S106 of FIG. 2. Subsequently, a system controller 22 checks the set condition of an image display ON/OFF switch 28 (step S127). If the image display ON/OFF switch 28 is set in an image display ON state, the system controller 22 turns on an image display on an image display unit 13 (step S128), and sets a through display state in which sensed image data is successively displayed (step S130), and the flow advances to step S131. If the image display ON/OFF switch 28 is set in an image display OFF state (step S127), the system controller 22 turns off an image display on the image display unit 13 (step S129), and the flow advances to step S134.

In step S131, the system controller 22 checks whether the antivibration ON/OFF switch 31 is ON. If the antivibration ON/OFF switch 31 is ON, the system controller 22 starts a blur detection process by which blur is detected by a blur detector 20 (step S132). This blur detector. 20 inputs a blur detection signal to the system controller 22. On the basis of this blur detection signal, the system controller 22 starts a blur correction process in which an antivibration controller 19 drives an actuator 4a to move a blur correction lens 4 (step S133), and the flow advances to step S201 described earlier. If the antivibration ON/OFF switch 31 is OFF (step S131), the flow advances to step S201 by skipping steps S132 and S133.

In step S134, the system controller 22 checks whether the antivibration ON/OFF switch 31 is ON. If the antivibration ON/OFF switch 31 is ON, the flow advances to step S301 described earlier. If the antivibration ON/OFF switch 31 is OFF, the flow advances to step S201.

That is, in this second embodiment, when an image display is ON, the system controller 22 starts blur detection and blur correction immediately after confirming that the antivibration ON/OFF switch 31 is ON. When an image display is OFF, the system controller 22 does not immediately start blur detection or blur correction even if the antivibration ON/OFF switch 31 is ON. That is, the system controller 22 starts blur detection and blur correction when a switch SW1 of a shutter switch 27 is turned on. If the antivibration ON/OFF switch 31 is OFF, the system controller 22 does not perform blur detection or blur correction regardless of whether an image display is ON or OFF.

As described above, the antivibration ON/OFF switch 31 permits blur correction to be executed only when a user requires it. This can prevent useless power consumption by unnecessary execution of blur correction. Also, even when blur correction is to be executed, the start timings of blur detection and blur correction are delayed as much as possible if an image display is OFF. This can reduce the power consumption.

Image Sensing Operation by Third Embodiment

In the third embodiment, similar to the above second embodiment, the power consumption is reduced by using an antivibration ON/OFF switch 31 for turning on and off antivibration. An image sensing operation in this third embodiment will be described below with reference to the flow charts in FIGS. 6 and 7.

Processes from initialization (step S141) to setting display (step S146) are analogous to the processes in steps S101 to S106 of FIG. 2. Subsequently, a system controller 22 checks the set condition of an image display ON/OFF switch 28 (step S147). If the image display ON/OFF switch 28 is set in an image display ON state, the system controller 22 turns on an image display on an image display unit 13 (step S148), and sets a through display state in which sensed image data is successively displayed (step S150), and the flow advances to step S151. If the image display ON/OFF switch 28 is set in an image display OFF state (step S147), the system controller 22 turns off an image display on the image display unit 13 (step S149), and the flow advances to step S154.

In step S151, the system controller 22 checks whether the antivibration ON/OFF switch 31 is ON. If the antivibration ON/OFF switch 31 is ON, the system controller 22 starts a blur detection process by which blur is detected by a blur detector 20 (step S152).

The blur detector 20 outputs a blur detection signal to the system controller 22. On the basis of this blur detection signal, the system controller 22 starts a blur correction process in which an antivibration controller 19 drives an actuator 4a to move a blur correction lens 4 (step S153), and the flow advances to step S201 described earlier. If the antivibration ON/OFF switch 31 is OFF (step S151), the flow advances to step S201 by skipping steps S152 and S153.

In step S154, the system controller 22 checks whether the antivibration ON/OFF switch 31 is ON. If the antivibration ON/OFF switch 31 is OFF, the flow advances to step S201.

If the antivibration ON/OFF switch 31 is ON, the system controller 22 starts a blur detection process by which blur is detected by the blur detector 20 (step S155). The system controller 22 then checks whether a switch SW1 is ON (step S401). If this switch SW1 is OFF, the flow returns to step S103 described earlier.

If the switch SW1 is ON, on the basis of a blur detection signal obtained by the blur detector 20 in step S155, the system controller 22 starts optical blur correction (step S402). This optical blur correction is done by controlling driving of the actuator 4a by using the antivibration controller 19, thereby moving the blur correction lens 4 in a direction perpendicular to an optical-axis direction.

Processes from a focusing-photometry process (step S403) to a recording process (step S408) are exactly the same as steps S202 to S207 in FIG. 3 described previously, so a detailed description thereof will be omitted.

In this third embodiment as described above, when an image display is ON, the system controller 22 starts blur detection and blur correction immediately after confirming that the antivibration ON/OFF switch 31 is ON. When an image display is OFF, the system controller 22 starts blur detection after confirming that the antivibration ON/OFF switch 31 is ON, and stars blur correction when the switch SW1 of a shutter switch 27 is turned on. If the antivibration ON/OFF switch 31 is OFF, the system controller 22 does not perform blur detection or blur correction regardless of whether an image display is ON or OFF.

In other words, the third embodiment performs basically the same processing as the second embodiment. In the second embodiment, however, when an image display is OFF, the system controller 22 starts blur detection and blur correction when confirming that the antivibration ON/OFF switch 31 is ON. The third embodiment differs from the second embodiment in that the system controller 22 starts only blur detection when confirming that the antivibration ON/OFF switch 31 is ON, and starts blur correction when the switch SW1 of the shutter switch 27 is turned on later.

As described above, when confirming that the antivibration ON/OFF switch 31 is ON, the system controller 22 starts only blur detection performed by, e.g., a vibration gyro which requires a long rise time before being capable of blur detection. Blur correction is started when the switch SW1 of the shutter switch 27 is turned on. Accordingly, it is possible to reduce the power consumption and at the same time rapidly activate blur correction when start of photographing is triggered.

Image Sensing Operation by Fourth Embodiment

In the fourth embodiment, similar to the first embodiment, the power consumption is reduced without using an antivibration ON/OFF switch 31 for turning on and off antivibration. In this embodiment, blur detection is executed first when a battery is replaced or the power supply is turned on by a mode dial 26. An image sensing operation in this fourth embodiment will be described below with reference to the flow chart in FIG. 8.

Processes from initialization (step S161) to setting display (step S166) are identical with the processes in steps S101 to S106 of FIG. 2. Subsequently, a system controller 22 starts blur detection by which blur is detected by a blur detector 20 (step S167).

The system controller 22 checks the set condition of an image display ON/OFF switch 28 (step S168). If the image display ON/OFF switch 28 is set in an image display ON state, the system controller 22 turns on an image display on an image display unit 13 (step S169), and sets a through display state in which sensed image data is successively displayed (step S171). Subsequently, on the basis of a blur detection signal from the blur detector 20, the system controller 22 starts optical blur correction (step S172), and the flow advances to step S201 mentioned earlier. This blur correction is done by controlling driving of an actuator 4a by using an antivibration controller 19, thereby moving a blur correction lens 4 in a direction perpendicular to an optical-axis direction.

Figure 7:
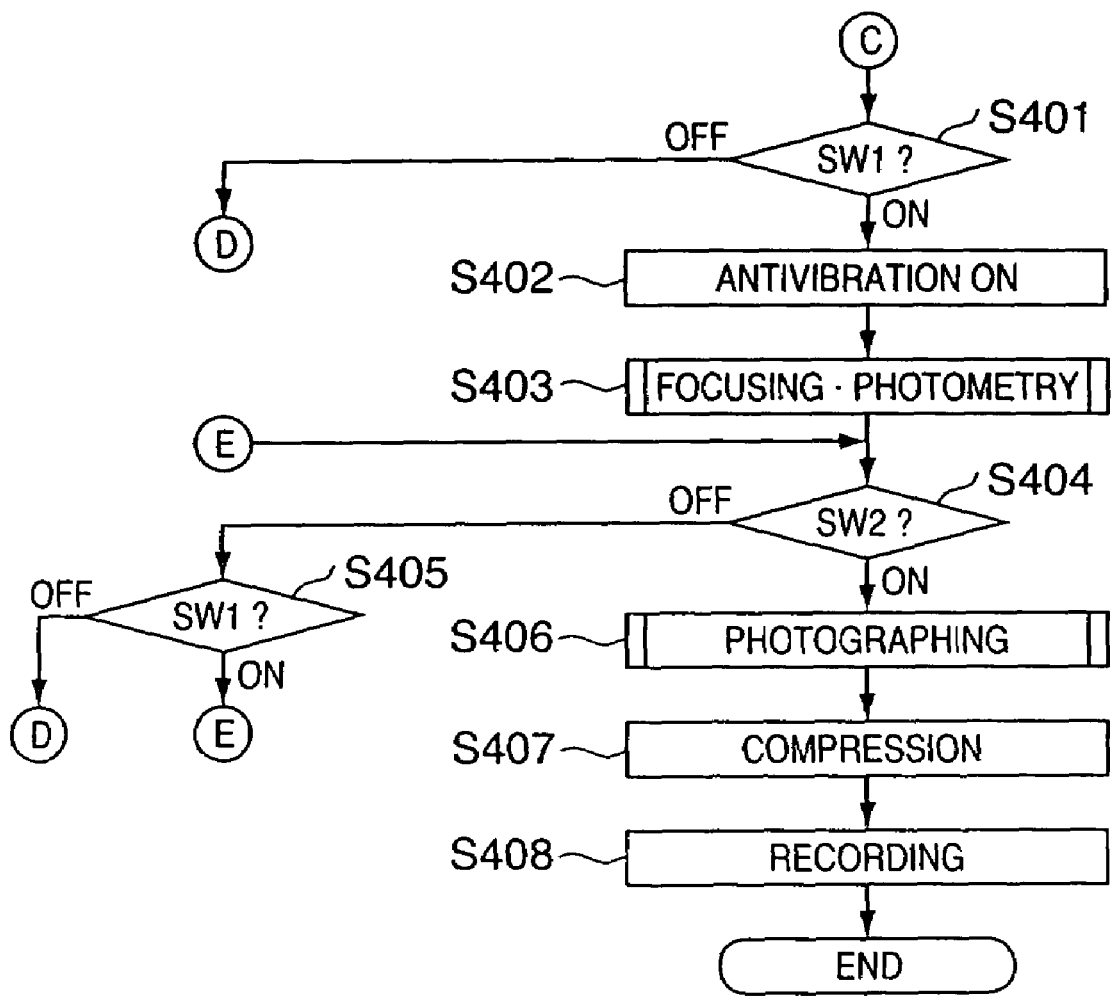
FIG. 7 is a flow chart for explaining processing continued from C in the flow chart of FIG. 6.
Figure 8:
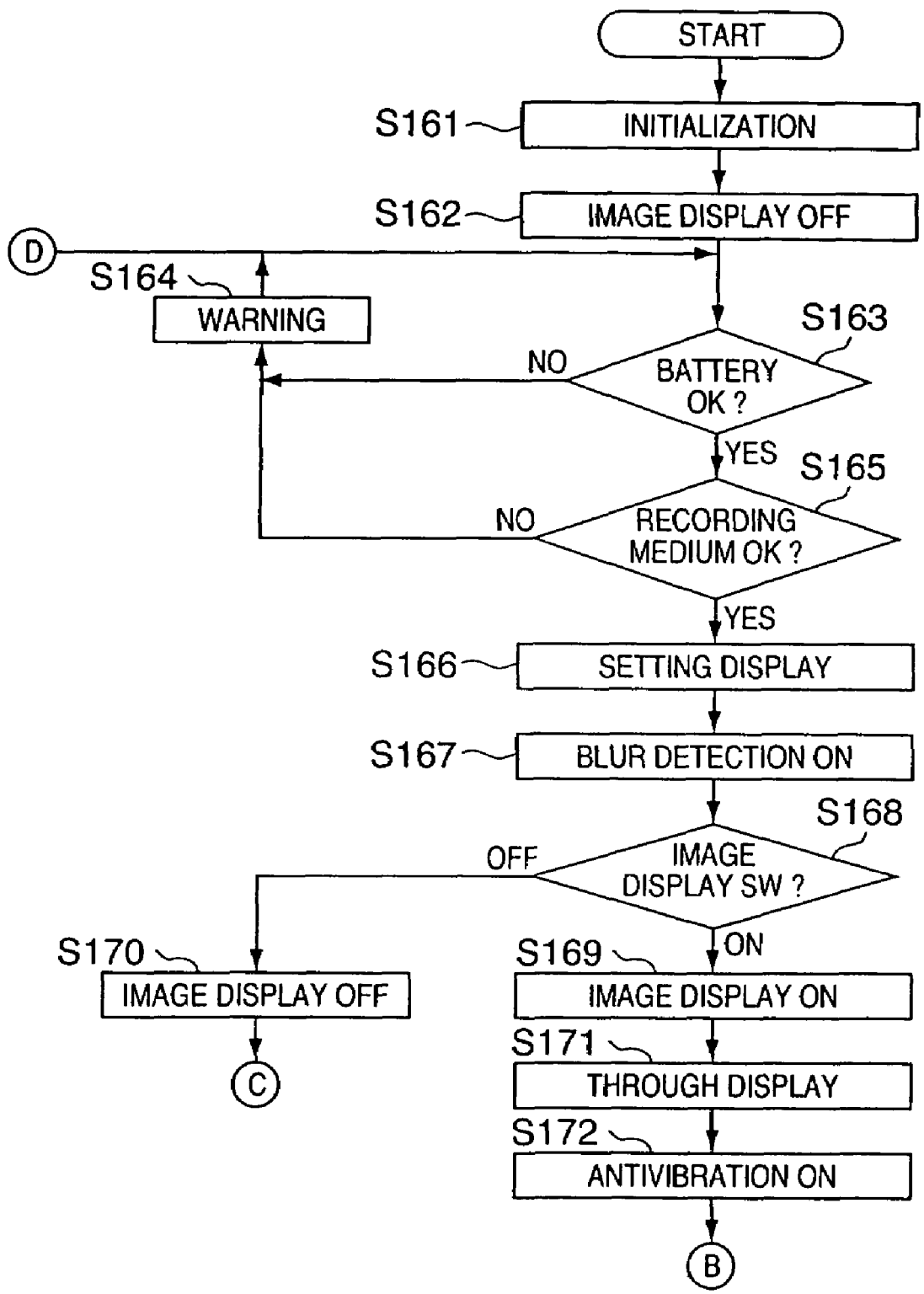
FIG. 8 is a flow chart showing an image sensing operation according to the fourth embodiment of the present invention.

On the other hand, if the image display ON/OFF switch 28 is set in an image display OFF state, the system controller 22 turns off an image display on the image display unit 13 (step S170), and the flow advances to step S401 in FIG. 7.

As described above, the fourth embodiment is basically the same as the first embodiment. In the first embodiment, however, the system controller 22 starts blur detection and blur correction after confirming that an image display on the image display unit 13 is ON. If an image display on the image display unit 13 is OFF, the system controller 22 starts blur detection and blur correction when the switch SW1 of a shutter switch 27 is turned on. The fourth embodiment differs from the first embodiment in that the system controller 22 starts blur detection before confirming ON/OFF of an image display on the image display unit 13, i.e., immediately after the power supply is turned on, and then starts blur correction when confirming that an image display on the image display unit 13 is ON. If an image display on the image display unit 13 is OFF, the system controller 22 starts blur correction when the switch SW1 of the shutter switch 27 is turned on.

As described above, blur detection performed by, e.g., a vibration gyro-which requires a long rise time before being capable of blur detection is started immediately after the power supply is turned on. After that, blur correction is started when it is confirmed that an image display on the image display unit 13 is ON. If an image display on the image display unit 13 is OFF, blur correction is started when the switch SW1 of the shutter switch 27 is turned on. Accordingly, it is possible to reduce the power consumption and at the same time rapidly activate blur correction while, if necessary, the blur correction result of an image is checked.

Image Sensing Operation by Fifth Embodiment

The fifth embodiment of the present invention will be described below with reference to FIGS. 11 to 14.

Figure 11:
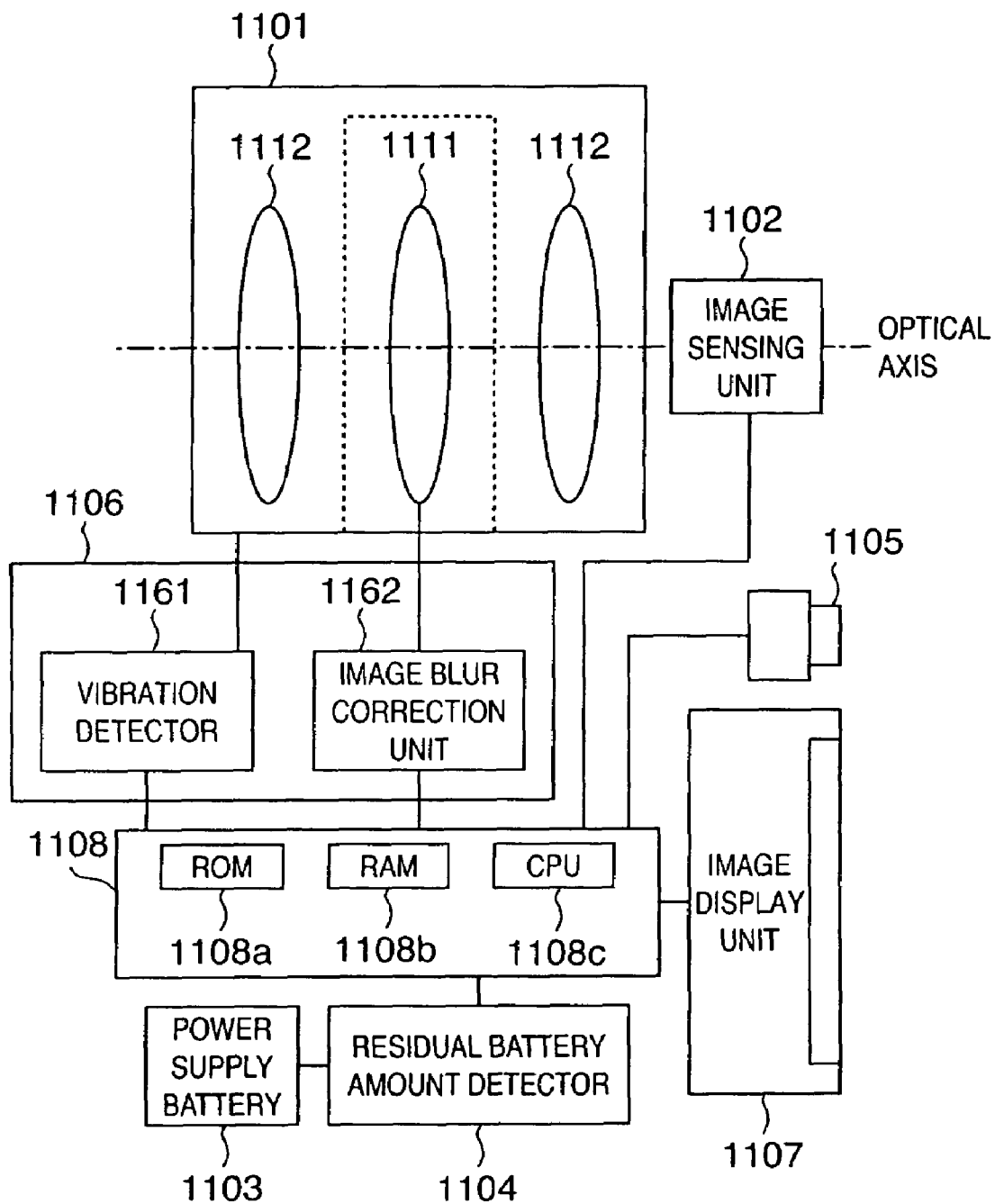
FIG. 11 is a block diagram showing the arrangement of an image sensing apparatus according to the fifth embodiment of the present invention;.

FIG. 11 is a block diagram showing an outline of the arrangement of an image sensing apparatus according to this embodiment. Referring to FIG. 11, a photographing optical system 1101 forms an object image on an image sensing unit. This photographing optical system 1101 comprises a main optical system 1111 and a correction optical system 1112.

Reference numeral 1102 denotes an image sensing unit. An optical object image formed by the photographing optical system 1101 is converted into an electrical signal by this image sensing unit 1102, and electrically processed after that.

A power supply battery 1103 is a driving source of the image sensing apparatus. A residual battery amount detector 1104 detects the residual amount of this power supply battery.

Reference numeral 1105 denotes a release switch. A sensed object image is recorded when this release switch 1105 is operated.

Reference numeral 1106 denotes an antivibration unit. This antivibration unit 1106 includes a vibration detector 1161, such as a vibration gyro, for detecting the direction and amount of a vibration applied to the photographing optical system 1101, and an image blur correction unit 1162 for driving the correction optical system 1112 on the basis of the detection result from the vibration detector 1161.

A display unit 1107 displays a sensed object image during recording and reproduces a recorded image during playback.

A controller 1108 controls the individual units in the apparatus, e.g., the photographing optical system 1101, the image sensing unit 1102, the residual battery amount detector 1104, the antivibration unit 1106, and the display unit 1107. This controller 1108 has a ROM 1108a for storing programs for executing image sensing control to be described later, a CPU 1108c for implementing control of each unit by executing the programs stored in the ROM 1108a, and a RAM 1108b to be used as a work area of the CPU 1108c.

Figure 12:
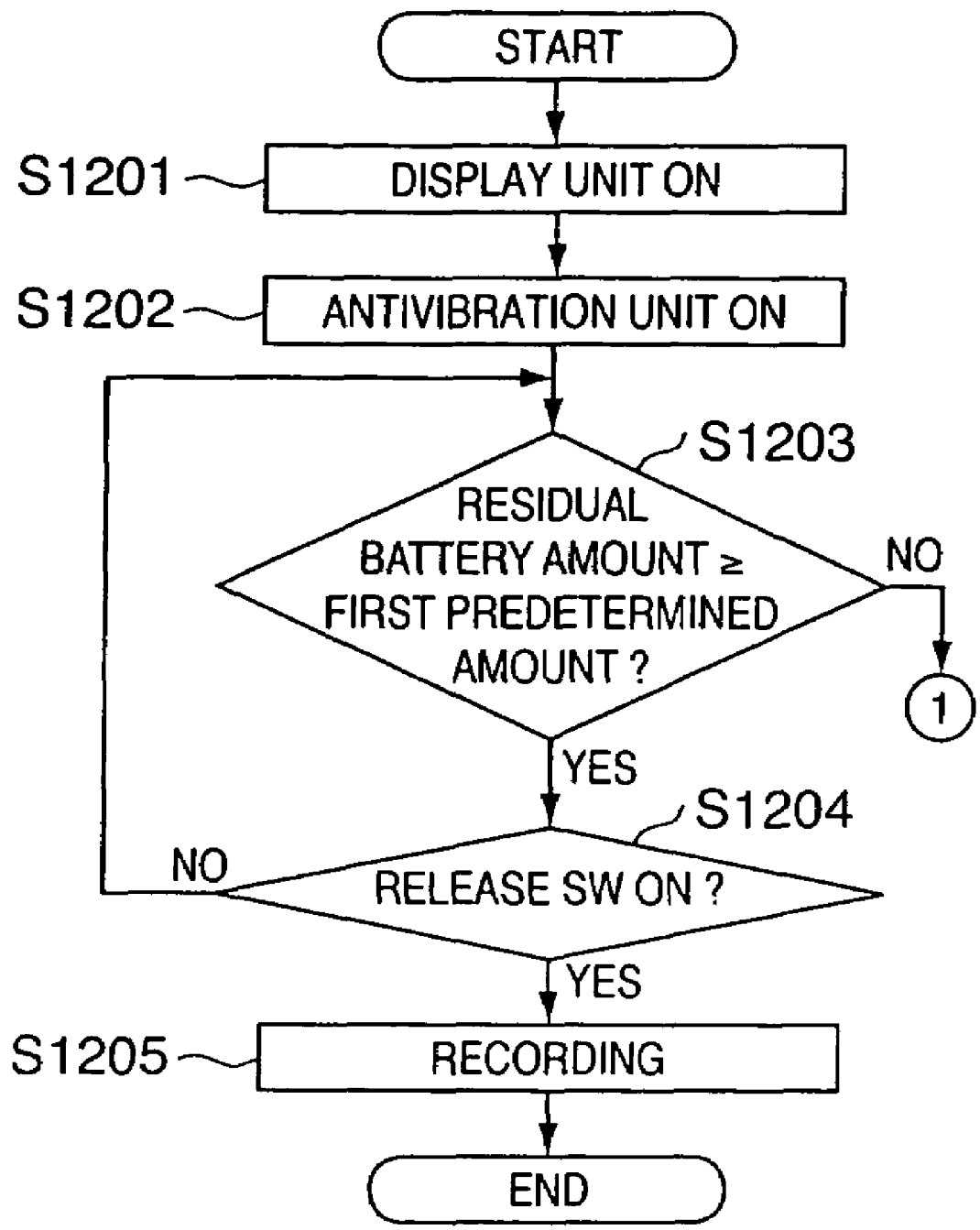
FIG. 12 is a flow chart showing an image sensing procedure performed by the image sensing apparatus shown in FIG. 11.
Figure 13:
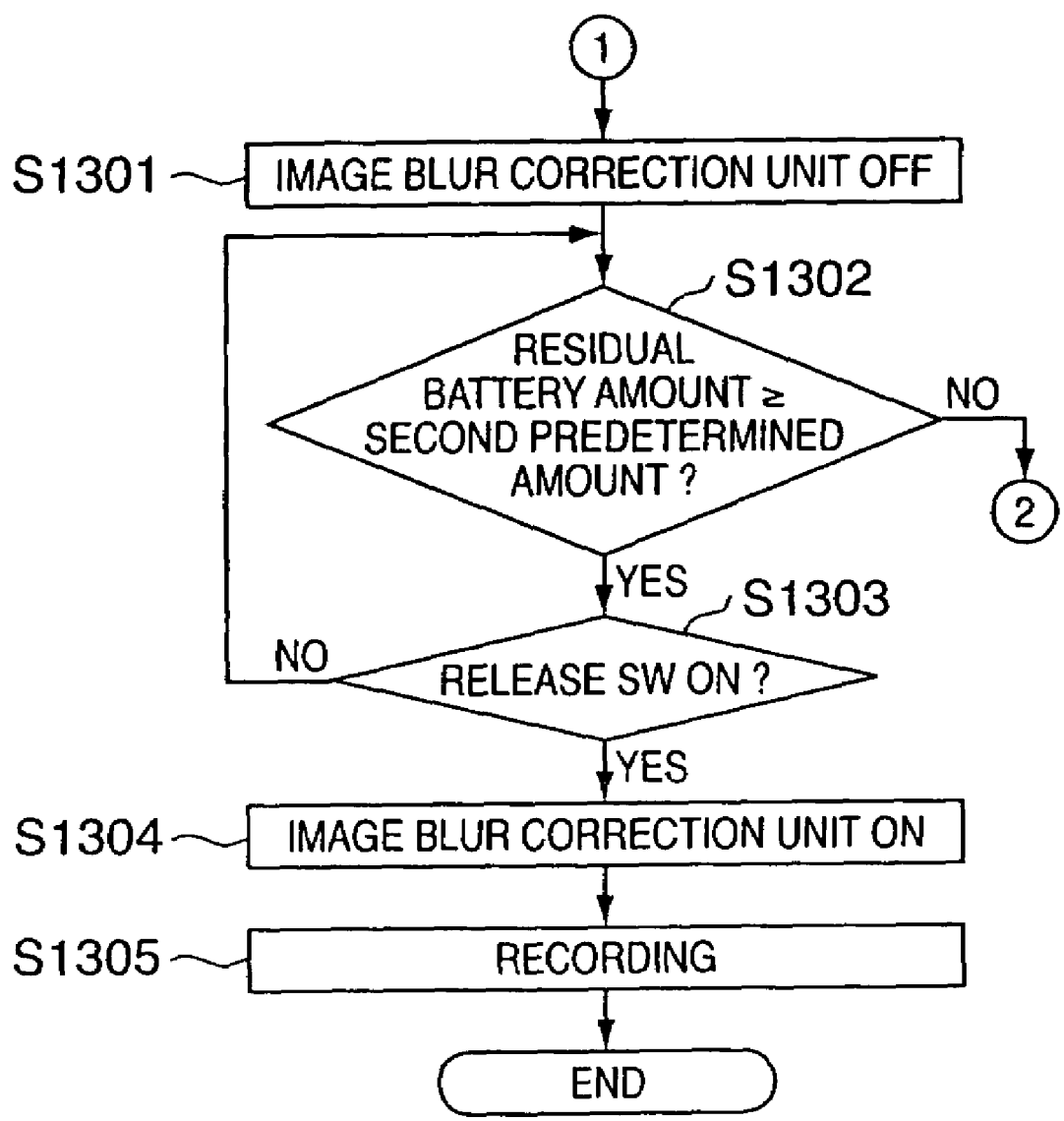
FIG. 13 is a flow chart showing the image sensing procedure performed by the image sensing apparatus shown in FIG. 11.
Figure 14:
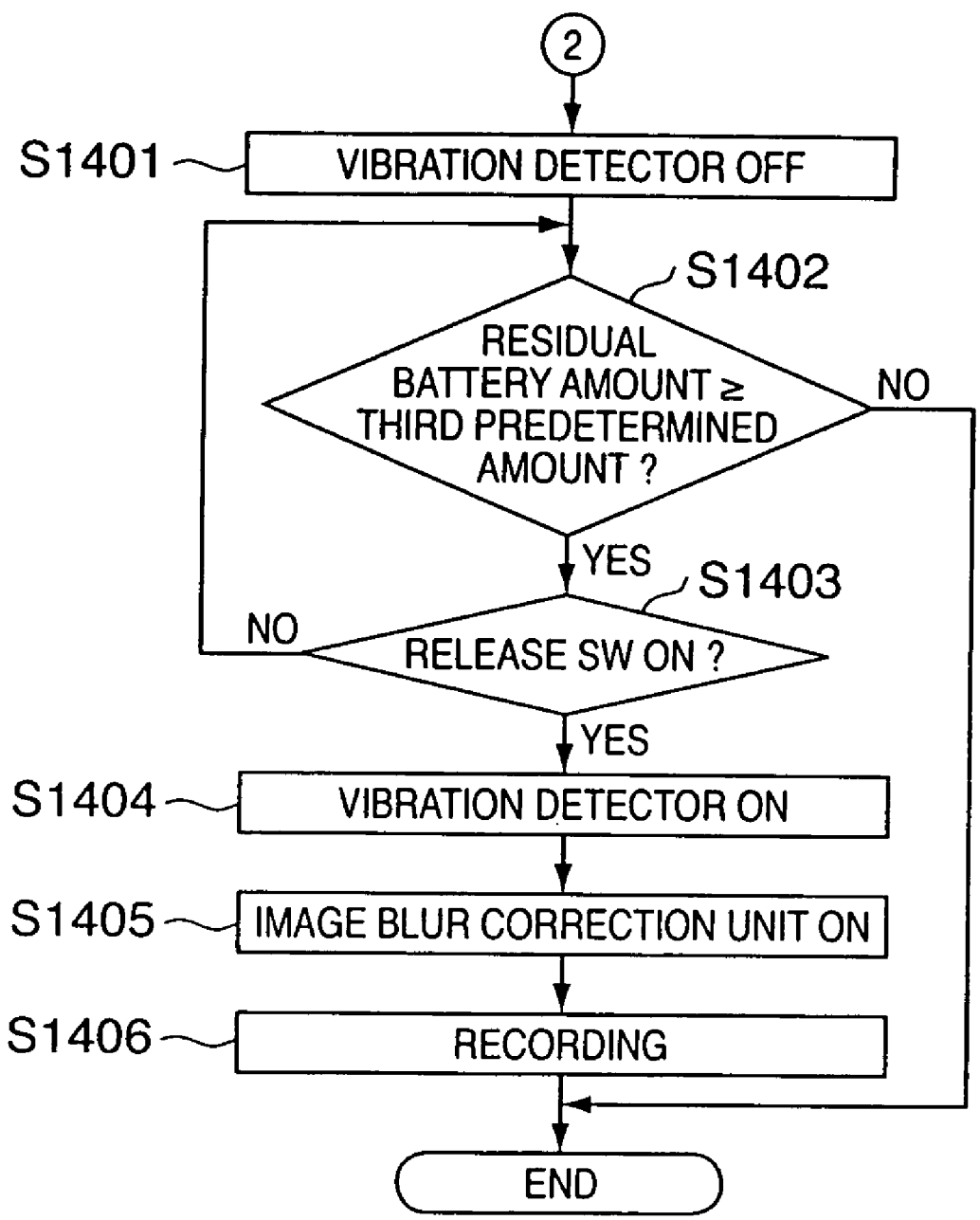
FIG. 14 is a flow chart showing the image sensing procedure performed by the image sensing apparatus shown in FIG. 11.

The operation of this image sensing apparatus with the above arrangement will be described below with reference to the flow charts in FIGS. 12 to 14. FIGS. 12 to 14 are flow charts showing the image sensing procedures performed by this image sensing apparatus.

First, to check an object to be sensed and recorded, an operator turns on the display unit 1107 (step S1201). By this operation, an object image currently being sensed is displayed on the display unit 1107. In this state, the antivibration unit 1106 is not functioning yet. Therefore, the displayed object image contains blur components, so it is not easy to check the object image on the display unit 1107.

Subsequently, the antivibration unit 1106 is turned on (step S1202) to remove the blur components and allows easy check of the object.

In this state, first residual battery amount detection is performed. That is, whether the residual battery amount is equal to or larger than a first predetermined amount is checked (step S1203). If the residual battery amount is equal to or larger than this first predetermined amount, whether the release switch 1105 is turned on is checked (step S1204). If the release switch 1105 is not turned on, the processing in step S1203 is again executed. That is, the first residual battery amount detection is repeated until the release switch 1105 is turned on, and the residual battery amount is always monitored. If it is determined in step S1204 that the release switch 1105 is turned on, recording of an object image currently being sensed by the image sensing unit 1102 is started (step S1205). Blur components have been removed from this object image recorded.

If it is determined in step S1203 that the residual battery amount is less than the first predetermined amount, the image blur correction unit 1162 is immediately turned off in order to suppress power consumption (FIG. 13: step S1301). This image blur correction unit 1162 requires a large amount of power because its correction optical system is always driven in accordance with detected vibrations. By turning off this unit, therefore, it is possible to obtain extra power and increase the number of frames to be photographed.

Since image blurs are no longer corrected, however, the object image on the display unit 1107 is, of course, more difficult to check than when image blurs are corrected.

In this state, second residual battery amount detection is performed. That is, whether the residual amount of the power supply battery 1103 is equal to or larger than a second predetermined amount is checked (step S1302). If the residual amount is equal to or larger than this second predetermined amount, whether the release switch 1105 is turned on is checked (step S1303). If the release switch 1105 is not turned on, the processing in step S1302 is again executed. That is, the second residual battery amount detection is repeated until the release switch 1105 is turned on, and the residual battery amount is always monitored. If it is determined in step S1303 that the release switch 1105 is turned on, the image blur correction unit 1162 is turned on (step S1304), and recording of an object image currently being sensed by the image sensing unit 1102 is started (step S1305). Since the image blur correction unit 1162 is activated prior to the object image recording operation, blur components have been removed from the object image to be recorded.

If it is determined in step S1302 that the residual amount of the power supply battery 1103 is less than the second predetermined amount, the vibration detector 1161 is turned off in order to further suppress the power consumption (FIG. 14: step S1401). This vibration detection unit detects the direction and amount of a vibration applied to the photographing optical system 1101. By turning off this unit, therefore, it is possible to further suppress the power consumption and increase the number of frames to be photographed.

The object image displayed on the display unit 1107 is the same as that displayed when only the image blur correction unit 1162 is turned off in step S1301.

In this state, third residual battery amount detection is performed. That is, whether the residual amount of the power supply battery 1103 is equal to or larger than a third predetermined amount is checked (step S1402) If the residual amount is equal to or larger than this third predetermined amount, whether the release switch 1105 is turned on is checked (step S1403). If the release switch 1105 is not turned on, the processing in step S1402 is again executed. That is, the third residual battery amount detection is repeated until the release switch 1105 is turned on, and the residual battery amount is always monitored. If it is determined in step S1403 that the release switch 1105 is turned on, the vibration detector 1161 is turned on (step S1404), the image blur correction unit 1162 is turned on (step S1405), and recording of an object image currently being sensed by the image sensing unit 1102 is started (step S1406). Since the vibration detector 1161 and the image blur correction unit 1162 are activated prior to the object image recording operation, blur components have been removed from the object image to be recorded.

If it is determined in step S1402 that the residual amount of the power supply battery 1103 is less than the third predetermined amount, it is determined that no image sensing is possible, and the image sensing operation is terminated.

In the above explanation, the relationship between the predetermined residual amounts of the power supply battery is the first predetermined amount>the second predetermined amount>the third predetermined amount.

In this embodiment as described above, driving of the antivibration unit 1106 is controlled in accordance with the detection result of the residual battery amount. More specifically, when the residual battery amount is less than the first predetermined amount and equal to or larger than the second predetermined amount, only the image blur correction unit 1162 is turned off. When the residual battery amount is less than the second predetermined amount and equal to or larger than the third predetermined amount, the image blur correction unit 1162 and the vibration detector 1161 are turned off. However, both the image blur correction unit 1162 and the vibration detector 1161 are turned on during recording. Accordingly, even if the residual battery amount is small, a certain number of frames to be photographed can be ensured without sacrificing the antivibration function.

In addition to the arrangement shown in FIG. 11, it is also possible to use a warning indication unit for warning that driving of the antivibration unit 1106 is limited in accordance with the residual battery amount. This warning indication unit allows a user to recognize the operation of the image sensing apparatus main body at that point. For example, the warning indication unit (1) turns off the image blur correction unit 1162 while an object is monitored if the residual battery amount is less than the first predetermined amount and equal to or larger than the second predetermined amount, (2) turns off the image blur correction unit 1162 and the vibration detector 1161 while an object is monitored if the residual battery amount is less than the second predetermined amount and equal to or larger than the third predetermined amount, and (3) terminates the photographing operation if the residual battery amount is less than the third predetermined amount, by (a) giving warning by using the display unit 1107,
(b) giving warning by using an LED, or
(c) giving warning by using sound. In either case, to reduce the cost and the installation space, this warning indication unit is desirably a member already used for another purpose, rather than a dedicated member. Since a user can confirm the present residual battery amount and the consequent changes in driving of the apparatus, he or she can determine, at any arbitrary timing, how to use the image sensing apparatus or when to replace the battery, in accordance with the status of the apparatus. This improves the operability and the ease of use.

The object of the present invention can also be achieved by supplying a storage medium storing program codes of software for implementing the functions of the above embodiments to an image sensing apparatus, and reading out and executing the program codes stored in the medium by a computer (a CPU or an MPU of the controller 1108) of the image sensing apparatus.

In this case, the program codes read out from the medium implement the novel functions of the present invention, and the medium for supplying these program codes constitutes the invention.

As this storage medium for supplying the program codes, it is possible to use, e.g., a floppy disk, hard disk, optical disk, magnetooptical disk, CD-ROM, CD-R, magnetic tape, nonvolatile memory card, and ROM.

Also, besides the functions of the above embodiments are implemented by executing the readout program codes by the computer, the present invention includes a case where an OS (Operating System) or the like running on the computer performs a part or the whole of actual processing in accordance with designations by the program codes and thereby implements the functions of the above embodiments.

Furthermore, the present invention includes a case where, after the program codes read out from the storage medium are written in a memory of a function extension board inserted into the computer or of a function extension unit connected to the computer, a CPU or the like of the function extension board or function extension unit performs a part or the whole of actual processing in accordance with designations by the program codes and thereby implements the functions of the above embodiments.

As many apparently widely different embodiments of the present invention can be made without departing from the spirit and scope thereof, it is to be understood that the invention is not limited to the specific embodiments thereof except as defined in the appended claims.

For example, in the above embodiments, the image display unit 13 is turned off by turning off all constituent elements of the image display unit 13. However, this image display unit 13 can also be turned off by turning off only some of its constituent elements.

When the image display unit 13 comprises an LCD and a backlight, the same processing as when an image display is turned off can be performed even if only the backlight is turned off while the LCD is kept on. This makes it possible to check a sensed image and save energy at the same time.

In the above embodiments, if the digital camera 1 is left to stand for a long time period while the image display unit 13 is kept on, an image display on this image display unit 13 can be automatically turned off to save energy. When this is the case, other sequences can be performed in the same manner as when the image display ON/OFF switch 28 is set in the image display OFF state.

In the above embodiments, when an image display on the image display unit 13 is OFF, blur correction is started when the switch SW1 of the shutter switch 27 is turned on. However, blur correction can also be started when the switch SW2 of the shutter switch 27 is turned on.

In the above embodiments, the photographing mode automatically starts when the power supply is turned on, and this photographing mode has not been explained. If the apparatus has a playback mode function, the photographic mode and this playback mode can, of course, be switched.

In the above embodiments, no optical blur correction is performed when an image display on the image display unit 13 is OFF. In the present invention, however, it is also possible to perform optical blur correction in a low-power-consumption mode, which consumes less power than optical blur correction performed when an image display on the image display unit 13 is ON.

In the above embodiments, an electronic viewfinder can also be used instead of the optical finder 34. In this case, this electronic viewfinder can be turned on and off independently of ON/OFF of an image display on the image display unit 13. When an image display on the image display unit 13 is OFF and an image display on the electronic viewfinder is ON, or when an image display on the image display unit 13 is ON and an image display on the electronic viewfinder is OFF, it is possible to determine whether to perform optical blur correction in accordance with, e.g., the state of the power consumption.

In the above embodiments, even when an image display on the image display unit 13 is OFF, information other than a sensed image can be displayed.

The recording unit 203 need not be a memory card such as a PCMCIA card or a compact flash, a hard disk, or the like but can be, e.g., a micro DAT, a magnetooptical disk, an optical disk such as a CD-R or a CD-WR, or a phase changing type optical disk. This recording unit 203 can also be an integrated composite medium of, e.g., a memory card and hard disk. Furthermore, a part can be detached from this composite medium.

In the above embodiments, the recording media are separated from and freely connectable to the digital camera 1. However, one or all of these recording media can also be kept fixed to the digital camera.

In the above embodiment, the vibration detector 1161 and the image blur correction unit 1162 can be turned on in accordance with the operation of the release switch 1105. For example, preparations of photographing such as auto-focusing and photometry can be designated by a first-stage operation, and start of photographing can be designated by a second-stage operation. When this is the case, various settings can be made such that the image blur correction unit 1162 is turned on in accordance with the designation of photographing preparations, the vibration detector 1161 is turned on in accordance with the designation of photographing preparations, or the image blur correction unit 1162 is turned on in accordance with the designation of photographing start.

In the above embodiment, no photographing is possible if the residual battery amount is less than the third predetermined amount. However, even when the residual battery amount is less than the third predetermined amount, if this residual battery amount is equal to or larger than a fourth predetermined amount, photographing alone can be permitted although the antivibration unit 1106 is not driven.

In the above embodiment, the display unit 1107 or a display of an object image on this display unit 1107 can be turned on and off. When the display unit 1107 is OFF, no object image is displayed on the display unit 1107 even if the residual battery amount is equal to or larger than the first predetermined amount. When this is the case, therefore, the vibration detector or the image blur correction unit 1162 need not be driven until the release switch 1105 is operated, in order to save energy.

In the present invention, the vibration detector 1161 in the above embodiment can take any form such as an angular acceleration detector, angular velocity detector, or angular displacement detector. Also, the present invention is applicable to a device which detects motion vectors of an image.

Furthermore, the software configuration and the hardware configuration of the above embodiments can be appropriately switched.

In the present invention, the whole or a part of the constitution of the claims or the constitution of the embodiments can form a single apparatus, can combine with another apparatus, or can be a constituent element of an apparatus.

The present invention is applicable to various forms of cameras such as a video movie camera, a video still camera, a camera using a silver halide film, a camera using interchangeable photographing lenses, a single-lens reflex camera, a lens shutter camera, and a monitoring camera. In addition, the present invention is applicable to apparatuses, such as image sensing apparatuses and optical apparatuses, other than cameras. Furthermore, the present invention can be applied to devices, methods, and media such as computer-readable storage media to be applied to these cameras and apparatuses such as image sensing apparatuses and optical apparatuses other than cameras. The present invention can also be applied to constituent elements of these devices, methods, and computer program products such as computer-readable storage media.

What is claimed is:

1. An image sensing apparatus to which a blur correction unit for correcting blur in an object image is applied, comprising:

an operation unit for designating start of photographing;

a determination unit for determining a battery level of a power supply battery for supplying power to said blur correction unit;

a control unit for allowing said blur correction unit to operate after said operation unit is activated in a case where a determination result by said determination unit indicates that the battery level is less than a predetermined level; and a blur detection unit which starts operating before said operation unit is activated in a case where a determination result by said determination unit indicates that the battery level is less than the predetermined level and not less than a second predetermined level, and starts operating after said operation unit is activated in a case where the battery level is determined less than the second predetermined level, wherein said blur correction unit operates on the basis of the detection result by said blur detection unit.

* * * * *